(12) United States Patent
Jeon et al.

(10) Patent No.: US 9,724,651 B2
(45) Date of Patent: Aug. 8, 2017

(54) CHEMICAL ADDITIVES FOR WATER FLUX ENHANCEMENT

(71) Applicants: LG NANOH2O, INC., El Segundo, CA (US); LG CHEM, LTD., Daejeon (KR)

(72) Inventors: Hyung Joon Jeon, Daejeon (KR); Jeff Koehler, Pasadena, CA (US); Hyungsam Choi, Daejeon (KR)

(73) Assignees: LG NANOH2O, INC., El Segundo, CA (US); LG CHEM, LTD., Daejeon (KR)

( * ) Notice: Subject to any disclaimer, the term of this patent is extended or adjusted under 35 U.S.C. 154(b) by 118 days.

(21) Appl. No.: 14/799,427

(22) Filed: Jul. 14, 2015

(65) Prior Publication Data

US 2017/0014779 A1    Jan. 19, 2017

(51) Int. Cl.
*B01D 69/12* (2006.01)
*B01D 61/02* (2006.01)
(Continued)

(52) U.S. Cl.
CPC ......... *B01D 69/125* (2013.01); *B01D 61/025* (2013.01); *B01D 71/022* (2013.01); *B01D 71/60* (2013.01); *C02F 1/441* (2013.01)

(58) Field of Classification Search
None
See application file for complete search history.

(56) References Cited

U.S. PATENT DOCUMENTS 3,231,597 A   1/1966   Fischer
3,291,660 A   12/1966  Oberth et al.
(Continued)

FOREIGN PATENT DOCUMENTS

EP   0176076 B1   9/1988
EP   1660884 B1   5/2012
(Continued)

OTHER PUBLICATIONS

Bazel; "The Effect of Solution Viscosity on the Flux and Rejection of Polyamide Membranes"; Thesis for Master of Science Degree; Ben-Gurion University of the Negev Jacob Institute for Desert Research; Sep. 2011; 65 Pages.
(Continued)

*Primary Examiner* — Krishnan S Menon
(74) *Attorney, Agent, or Firm* — Dentons US LLP

(57) ABSTRACT

Provided are flux enhancing inclusion complexes for preparing highly permeable thin film composite membranes, and processes that include adding the flux enhancing inclusion complexes to the organic phase or aqueous phase prior to interfacial polymerization of the thin film composite membrane. The thin film composite membranes are suitable for nanofiltration, and reverse and forward osmosis. The provided processes can include contacting a porous support membrane with an aqueous phase containing a polyamine to form a coated support membrane, and applying an organic phase containing a polyfunctional acid halide and a flux enhancing inclusion complex to the coated support membrane to interfacially polymerize the polyamine and the polyfunctional acid halide to form a discrimination layer to form thin film composite membranes.

21 Claims, 1 Drawing Sheet

(51) Int. Cl.
*C02F 1/44* (2006.01)
*B01D 71/60* (2006.01)
*B01D 71/02* (2006.01)

(56) References Cited

U.S. PATENT DOCUMENTS

| | | |
|---|---|---|
| 3,926,798 A | 12/1975 | Cadotte |
| 4,039,440 A | 8/1977 | Cadotte |
| 4,214,994 A | 7/1980 | Kitano et al. |
| 4,277,344 A | 7/1981 | Cadotte |
| 4,337,154 A | 6/1982 | Fukuchi et al. |
| 4,482,736 A | 11/1984 | Forster et al. |
| 4,842,736 A | 6/1989 | Bray et al. |
| 4,855,048 A | 8/1989 | Tang et al. |
| 4,902,424 A | 2/1990 | Wrasidlo |
| 4,948,507 A | 8/1990 | Tomaschke |
| 4,983,291 A | 1/1991 | Chau et al. |
| 5,047,563 A | 9/1991 | Denton et al. |
| 5,108,607 A | 4/1992 | Kraus et al. |
| 5,247,078 A | 9/1993 | Champion et al. |
| 5,543,046 A | 8/1996 | Van Rijn |
| 5,641,466 A | 6/1997 | Ebbesen et al. |
| 5,658,460 A | 8/1997 | Cadotte et al. |
| 6,024,873 A | 2/2000 | Hirose et al. |
| 6,153,133 A | 11/2000 | Kaimai et al. |
| 6,337,018 B1 | 1/2002 | Mickols |
| 6,437,189 B1 | 8/2002 | Prasad et al. |
| 6,783,745 B1 | 8/2004 | Voronov et al. |
| 7,064,214 B2 | 6/2006 | Senanayake et al. |
| 7,078,007 B2 | 7/2006 | Yu et al. |
| 7,109,140 B2 | 9/2006 | Marand et al. |
| 7,282,573 B2 | 10/2007 | Chaudhuri et al. |
| 7,422,667 B1 | 9/2008 | Zhou et al. |
| 7,490,725 B2 | 2/2009 | Pinnau et al. |
| 7,491,334 B2 | 2/2009 | Comstock |
| 7,579,463 B2 | 8/2009 | Gee et al. |
| 7,648,765 B2 | 1/2010 | Takahashi et al. |
| 7,816,564 B2 | 10/2010 | Balaban et al. |
| 7,989,617 B2 | 8/2011 | Gee et al. |
| 8,163,814 B2 | 4/2012 | Emrick et al. |
| 8,173,211 B2 | 5/2012 | Shaffer et al. |
| 8,177,978 B2 | 5/2012 | Kurth et al. |
| 8,182,695 B2 * | 5/2012 | Whiteford ............ C07D 498/18 205/751 |
| 8,505,743 B2 | 8/2013 | Sarkar et al. |
| 8,505,745 B2 | 8/2013 | Mayes et al. |
| 8,567,612 B2 | 10/2013 | Kurth et al. |
| 8,580,341 B2 | 11/2013 | Wang et al. |
| 8,754,139 B2 | 6/2014 | Allen et al. |
| 8,828,533 B2 | 9/2014 | Dai et al. |
| 2004/0101760 A1 | 5/2004 | Kerres et al. |
| 2008/0190836 A1 | 8/2008 | Beppu et al. |
| 2009/0050558 A1 | 2/2009 | Ishizuka et al. |
| 2011/0174728 A1 | 7/2011 | Eisen et al. |
| 2012/0080381 A1 | 4/2012 | Wang et al. |
| 2012/0292249 A1 | 11/2012 | Wang et al. |
| 2013/0199988 A1 | 8/2013 | Jons et al. |
| 2014/0014575 A1 | 1/2014 | Kwon et al. |

FOREIGN PATENT DOCUMENTS

| | | |
|---|---|---|
| WO | 2004/056737 A1 | 7/2004 |
| WO | 2005/016874 A2 | 2/2005 |
| WO | 2014/080426 A1 | 5/2014 |

OTHER PUBLICATIONS

Bradshaw et al.; "Preparation of Diamino Ethers and Polyamines"; Tetrahedron vol. 48, No. 22, pp. 4475-4515; 1992; 41 Pages.
Cahill et al.; "Microscopy and Microanalysis of Reverse-Osmosis and Nanofiltration Membranes"; MRS Bulletin, vol. 33; (27-32); Jan. 2008; 6 Pages.
Chen et al.; "Novel Thin-Film Composite Membranes with Improved Water Flux from Sulfonated Cardo Poly(arylene ether sulfone) Bearing Pendant Amino Groups"; Journal of Membrane Sciences; 310 (2008) 102-109; 8 Pages.
Duan et al.; "Influence of Hexamethyl Phosphoramide on Polyamide Composite Reverse Osmosis Membrane Performance"; Separation and Purification Technology 75 (2010) 145-155; 11 Pages.
Gaid; "A Large Review of the Pre Treatment"; Expanding Issues in Desalination, Prof. Robert Y. Ning (Ed.), ISBN: 978-953-307-624-9, InTech, Available from: http://www.intechopen.com/books/expanding-issues-in-desalination/a-large-review-of-the-pre-treatment.; (2011); 55 Pages.
Ghosh et al.; "Impacts of Reaction and Curing Conditions on Polyamide Composite Reverse Osmosis Membrane Properties"; Journal of Membrane Science 311 (2008) 34-45; 12 Pages.
Gohil et al; "Development of High Flux Thin-Film Composite Membrane for Water Desalination: A Statistical Study Using Response Surface Methodology"; Desalination and Water Treatment (2014) 52:28-30, 5219-5228; 11 Pages.
Ikeda et al.; "Synthesis of Substituted Crown Ethers from Oligoethylene Glycols"; Journal of Organic Chemistry (1980) 45:5355-5358; 4 Pages.
Inoue et al.; "Molecular Design of Crown Ethers—Extraction of Alkaline Earth and Heavy Metal Picrates with 14- to 17-Crown-5 and 17- to 22-Crown-6"; Bull. Chem. Soc. Jpn., 58, 525-530; 1985; 6 Pages.
Kim et al.; "Positron Annihilation Spectroscopic Evidence to Demonstrate the Flux-Enhancement Mechanism in Morphology-Controlled Thin-Film Composite (TFC) Membrane"; Environ. Sci. Technol. (2005) 39:1764-1770; 7 Pages.
Krakowiak et al.; "A New Building Block Method to Synthesize Symmetrical and Asymmetrical Per-N-alkyl-Substituted Polyaza-Crown Compounds"; Journal of Organic Chemistry; 54, 4061-4067; 1989; 7 Pages.
Kochkodan et al.; "A Comprehensive Review on Surface Modified Polymer Membranes for Biofouling Mitigation"; Desalination 356 (2015) 187-207; 21 Pages.
Kwak et al; "Structure-Motion-Performance Relationship of Flux-Enhanced Reverse Osmosis (RO) Membranes Composed of Aromatic Polyamide Thin Films"; Environ. Sci. Technol. (2001) 35:4334-4340; 7 Pages.
Kwak et al.; "Use of Atomic Force Microscopy and Solid-State NMR Spectroscopy to Characterize Structure-Property-Performance Correlation in High-Flux Reverse Osmosis (RO) Membranes"; Journal of Membrane Sciences; 158 (1999) 143-153; 11 Pages.
Lau et al.; "A Recent Progress in Thin Film Composite Membrane: A Review"; Desalination 287 (2012) 190-199; 10 Pages.
Liu et al.; "Thin-Film Composite Membrane Formed by Interfacial Polymerization of Polyvinylamine (PVAm) and Trimesoyl Chloride (TMC) for Nanofiltration"; Desalination; 288 (2012) 98-107; 10 Pages.
Montgomery; "Applications of Crown Ethers in Industrial Anionic Polymerizations"; Thesis for Master of Science Degree, School of Textile Engineering, Georgia Institute of Technology; Dec. 1977; 114 Pages.
Saehan Industries Inc.; "Pilot Study for Evaluation of Saehan FRM RO Elements at Bedok Water Reclamation Plant, Singapore"; Project Report No. CAWT/2003/042/R; Singapore Utilities International Pte, Ltd., Aug. 2003; 13 Pages.
Shannon; "Revised Effective Ionic Radii and Systematic Studies of Interatomic Distances in Halides and Chalcogenides"; Acta Cryst. A32, 751; 1976; 17 Pages.
Shannon et al.; "Effective Ionic Radii in Oxides and Flourides"; Acta Cryst. B25, 925; 1969; 22 Pages.
Tarboush et al.; "Recent Advances in Thin Film Composite (TFC) Reverse Osmosis and Nanofiltration Membranes for Desalination"; J. Applied Membrane Science & Technology, vol. 10, Dec. 2009, pp. 41-50; 10 Pages.
Tarboush et al.; "Preparation of thin-film-composite polyamide membranes for desalination using novel hydrophilic surface modifying macromolecules"; J. Membrane Science 325 (2008) 166-175; 10 Pages.

(56) References Cited

OTHER PUBLICATIONS

Tu et al.; "Boron Removal by Reverse Osmosis Membranes in Seawater Desalination Applications"; Separation and Purification Technology 75 (2010) 87-101; 15 Pages.

Wend et al.; "Pretreatment for Membrane Water Treatment Systems: A Laboratory Study"; Water Research 37 (2003) 3367-3378; 12 Pages.

Xie et al.; "Polyamide Interfacial Composite Membranes Prepared from m-Phenylene Diamine, Trimesoyl Chloride and a new Disulfonated Diamine"; Journal of Membrane Science 403-404 (2012) 152-161; 10 Pages.

Yang et al.; "Molecular Design of Crown Ethers. 22. Synthesis of Benzocrown Ether Derivatives and Their Solvent Extraction with Univalent/Bivalent Metal Picrates"; Chinese Journal of Chemistry; 22, 616-618; 2004; 3 Pages.

\* cited by examiner

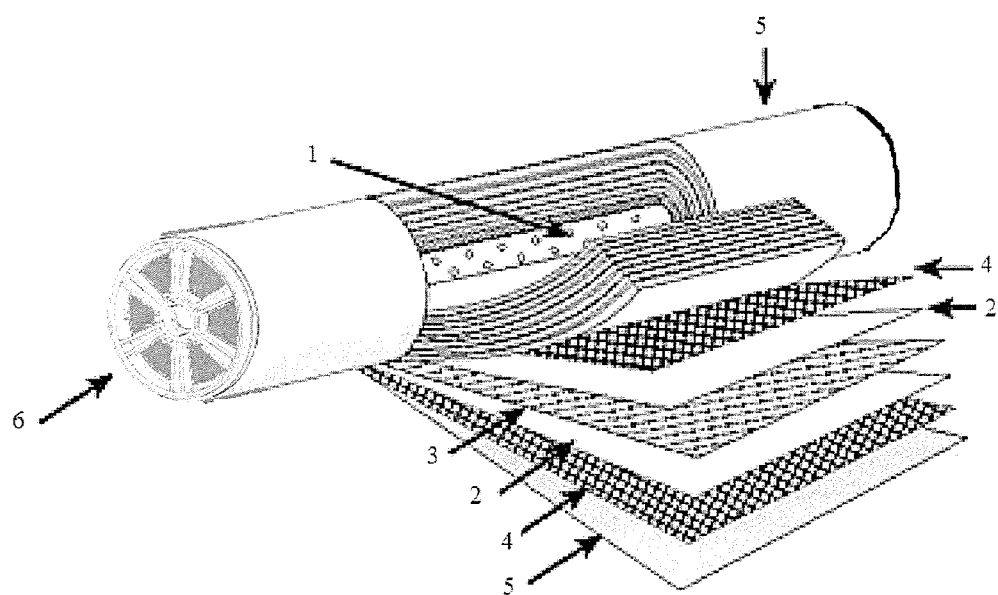

CHEMICAL ADDITIVES FOR WATER FLUX ENHANCEMENT

FIELD OF THE INVENTION

The present invention relates to thin film composite (TFC) membranes, including membranes used for nanofiltration, reverse or forward osmosis, e.g., to purify water, including tap water, brackish water and sea water, and more particularly to additives for enhancing water flux in TFC membranes and processes for producing TFC membranes, the processes including the addition of chemical additives that enhance water flux while having minimal negative impact on, or maintaining or improving rejection characteristics of the membranes.

BACKGROUND OF THE INVENTION

A thin film composite (TFC) membrane is a membrane that has layers of dissimilar materials joined together to form a single membrane. This layered construction permits the use of material combinations that optimize performance and durability of the membrane.

TFC membranes are used for nanofiltration, and in reverse osmosis and forward osmosis membranes for treating tap water, brackish water and sea water. Such membranes typically are made by interfacial polymerization of a monomer in a nonpolar (e.g., organic) phase together with a monomer in a polar (e.g., aqueous) phase on a porous support membrane. TFC membranes are used where flux and substantial rejection characteristics are required, e.g., in the purification of water. Various materials and chemical additives have been added to TFC membranes to increase flux without reducing rejection characteristics and have met with limited success. Such membranes are also subject to fouling resulting in reduced flux as contaminants, e.g., material from the brackish or seawater to be purified, build up on the surface of the TFC membrane.

What are needed are chemical additives that can be added, particularly additives that can be dissolved in the organic phase, during membrane formation that result in membranes with improved flux while having negligible negative impact on salt rejection, or maintaining or improving salt rejection characteristics, as well as methods for preparing such improved TFC membranes.

SUMMARY OF THE INVENTION

Accordingly, the present invention is directed to chemical additives that can be included during membrane formation, particularly additives that can be dissolved in the organic phase during preparation of TFC membranes, that enhance flux of the membranes while having only slight negative impact on salt rejection, or maintaining or improving salt rejection, and that substantially obviate one or more of the problems due to limitations and disadvantages of the related art.

In one aspect, processes for the production of TFC membranes having increased flux are provided, where the process includes providing a porous support membrane, and contacting on the porous support membrane a first solution containing a polyamine, such as 1,3-diaminobenzene, and with a second solution containing a flux enhancing inclusion complex and a polyfunctional acyl halide, e.g., trimesoyl chloride, where when the solutions are contacted, interfacial polymerization between the polyamine and the polyfunctional acid halide form a discrimination layer on the porous support membrane to form a highly permeable reverse osmosis membrane with increased flux, rejection and antifouling characteristics. The flux enhancing inclusion complex includes a host component having a cavity, and guest component within the cavity, where the guest component includes a metal chelate containing a metal atom or metal ion and a bidentate ligand. In some embodiments, the flux enhancing inclusion complex includes a crown ether or two glyme molecules as the host component having a cavity.

Also provided are interfacial polymerization processes for preparing a highly permeable RO membrane, comprising: contacting on a porous support membrane, a) a first solution containing 1,3-diaminobenzene, and b) a second solution containing trimesoyl chloride and the flux enhancing inclusion complex provided herein, and recovering a highly permeable RO membrane.

An advantage of the present invention is that the highly permeable RO membranes produced by the provided methods, which include interfacial polymerization in the presence of a flux enhancing inclusion complex, can purify seawater water at high flux while maintaining or improving salt rejection. High flux is important for energy efficiency of the process of water purification. High flux can allow a reduction in operating costs compared to standard high pressure seawater desalination systems.

Provided herein are flux enhancing inclusion complexes that include a host component having a cavity and a guest component within the cavity, where the guest component includes a metal chelate containing a metal atom or metal ion, and a bidentate ligand. The host component can include a crown ether or derivative thereof. The crown ether can be selected from among 12-crown-4, 15-crown-5, 18-crown-6, 20-crown-6, 21-crown-7, 24-crown-8, dicyclohexyl-18-crown-6, dibenzo-18-crown-6, 1,10-diaza-18-crown-6, 1,7,13-triaza-18-crown-6, and 1,4,10,13-tetraaza-18-crown-6, and the crown ether can be unsubstituted or can be substituted with one or more substituents selected from among vinyl, benzo, amido, aryl, thia, aza, alkyl, haloalkyl, and nitro substituents and combinations thereof. In some embodiments, the host component can include at least two glyme molecules. The at least two glyme molecules interact to form the host component having a cavity therein.

In the flux enhancing inclusion complexes provided herein, the metal atom or metal ion can be any metal that can form a coordination complex with ligands thereby forming a metal chelate. The metal can be any metal from Groups 2-15 of the Periodic Table (IUPAC). The metal atom or metal ion can be selected from among Group 2 or Group 13 of the periodic table. The metal atom or metal ion can be an alkaline earth metal. The metal atom or metal ion can be selected from among those metals where the size of the metal atom is from about 130 pm to about 220 pm. The metal atom or metal ion can be selected to have a crystal ionic radius of from about 0.5 nm to about 1.85. The metal atom or metal ion can be selected to have an ionic radius greater than about 1 nm.

In the flux enhancing inclusion complexes provided herein, the metal chelate can include a bidentate ligand. The bidentate ligand of the metal chelate can be selected from among:

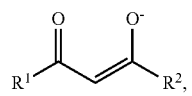

Formula 1

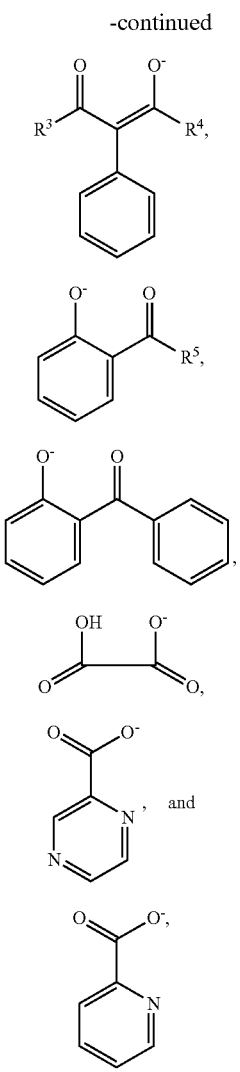

Formula 2

Formula 3

Formula 4

Formula 5

Formula 6 and

Formula 7 where each of $R^1$, $R^2$, $R^3$, $R^4$ and $R^5$ separately can be selected from among a $C_1$-$C_{10}$ alkyl, a halogenated $C_1$-$C_{10}$ alkyl, a 5-membered aromatic ring, a 6-membered aromatic ring, an aromatic bicyclic ring system containing two fused 6-membered rings, and an aromatic bicyclic ring system containing a 5-membered ring fused to a 6-membered aromatic ring. The bidentate ligand can be a beta-diketonate or a fluorinated beta-diketonate. The bidentate ligand can be an acetylacetonate (acac) or fluorinated acetylacetonate.

In the flux enhancing inclusion complexes provided herein, the bidentate ligand can be selected from among pentane-2,4-dionate, 1,5-difluoro-pentane-2,4-dionate, 1,1,5,5-tetrafluoropentane-2,4-dionate, 1,1,1,5,5,5-hexafluoro-pentane-2,4-dionate, propane-1,3-dionate, butane-1,3-dionate, 4-fluorobutane-1,3-dionate, 4,4-difluorobutane-1,3-dionate, 4,4,4-trifluorobutane-1,3-dionate, heptane-3,5-dionate, 1-fluorohexane-2,4-dionate, 1,5-difluoropentane-2,4-dionate, 1,1,5-trifluoropentane-2,4-dionate, 1,1,5,5-tetrafluoro-pentane-2,4-dionate, 1,1,1,5,5-pentafluoro-pentane-2,4-dionate, 1,1,1,5,5,5-hexa-fluoropentane-2,4-dionate and octane-3,5-dionate and combinations thereof.

In the flux enhancing inclusion complexes provided herein, the metal chelate containing a bidentate ligand and a metal atom or metal ion can be selected from among Al(acac)$_3$, Al(F6acac)$_3$, Ba(acac)$_2$, Ba(F6acac)$_2$, Be(acac)$_2$, Be(F6acac)$_2$, Ca(acac)$_2$, Ca(F6acac)$_2$, Cd(acac)$_2$, Cd(F6acac)$_2$, Ce(acac)$_3$, Ce(F6acac)$_3$, Cr(acac)$_3$, Co(acac)$_3$, Cu(acac)$_2$, Cu(F6acac)$_2$, Dy(acac)$_3$, Er(acac)$_3$, Fe(acac)$_2$, Fe(acac)$_3$, Ga(acac)$_3$, Hf(acac)$_4$, In(acac)$_3$, K(acac), Li(acac), Mg(acac)$_2$, Mg(F6acac)$_2$, Mn(acac)$_2$, Mn(acac)$_3$, MoO$_2$(acac)$_2$, MoO$_2$(F6acac)$_2$, Na(acac), Nd(acac)$_3$, Nd(F6acac)$_3$, Ni(acac)$_2$, Ni(F6acac)$_2$, Pd(acac)$_2$, Pr(acac)$_3$, Pr(F6acac)$_3$, Ru(acac)$_3$, Ru(F6acac)$_3$, Sc(acac)$_2$, Sc(F6acac)$_2$, Sm(acac)$_3$, Sn(acac)$_2$, Sn(acac)$_2$Cl$_2$, t-butyl-Sn(acac)$_2$, t-butyl-Sn(acac)$_2$Cl$_2$, Sn(F6acac)$_2$, Sr(acac)$_2$, Sr(F6acac)$_2$, Tb(acac)$_3$, V(acac)$_3$, Y(acac)$_3$, Y(F6acac)$_3$, Zn(acac)$_2$, Zn(F6acac)$_2$, and Zr(acac)$_4$, wherein F6acac refers to 1,1,1,5,5,5-hexafluoroacetylacetonate.

Also provided are processes for preparing a thin film composite membrane. The processes can include preparing an aqueous phase containing a polyamine, and an organic phase containing a polyfunctional acid halide and a flux enhancing inclusion complex; applying the aqueous phase to a surface of a porous support membrane to form a coated support membrane; and applying the organic phase to the coated support membrane and interfacially polymerizing the polyamine and the polyfunctional acid halide to form a discrimination layer of a thin film composite membrane including the porous support membrane and the discrimination layer, the thin film composite membrane having a water flux that is greater than the water flux of a thin film composite membrane prepared in the absence of the flux enhancing inclusion complex. The flux enhancing inclusion complex can be included in the organic phase, or in the aqueous phase, or in the organic phase and the aqueous phase. The amount of the flux enhancing inclusion complex included in the organic phase, or in the aqueous phase, or in both the organic phase and the aqueous phase is from about 0.001 wt % to about 1 wt %, based on the weight of the organic phase or the aqueous phase.

The processes provided herein can further include adding a processing aid selected from among a surfactant, a co-solvent, a drying agent, a catalyst or any combination thereof to the aqueous phase or organic phase prior to applying the aqueous phase or organic phase to the porous support membrane. The amount of processing aid added can be from about 0.001 wt % to about 10 wt % based on the weight of the aqueous phase or organic phase The processes provided herein can further include adding hexamethyl phosphoramide (HMPA) or a dialkyl sulfoxide or a combination thereof to the aqueous phase or organic phase or both. The amount of HMPA or dialkyl sulfoxide added can be in an amount of from about 0.5 wt % to 5 wt % based on the weight of the aqueous phase or the organic phase. The dialkyl sulfoxide can be of the formula:

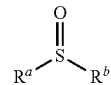

where each of $R^a$ and $R^b$ independently is selected from among $C_1$-$C_{25}$ alkyl and $C_1$-$C_{20}$ hydroxyalkyl. The dialkyl sulfoxide can be dimethyl sulfoxide or diethyl sulfoxide.

The processes provided herein can further include adding nanoparticles to the aqueous phase or organic phase prior to and interfacially polymerizing the polyamine and the polyfunctional acid halide. The nanoparticles can be selected from among zeolites, fullerenes and carbon nanotubes and combinations thereof. The amount of nanoparticles present can be in an amount from about 0.001 wt % to about 0.5 wt % based on the weight of the aqueous phase or the organic phase. The processes provided herein can produce a thin film composite membrane that is a reverse osmosis membrane. Also provided are thin film composite membranes produced using the processes provided herein. In some embodiments, the membranes exhibit a water flux of at least 30 gfd when the membrane is exposed to deionized water containing 32,000 ppm NaCl at a temperature of 25° C. and a pressure of 800 psi. In some embodiments, the membranes exhibit a salt rejection of at least 96% and a water flux of at least 35 gfd when the membrane is exposed to deionized water containing 32,000 ppm NaCl at a temperature of 25° C. and a pressure of 800 psi.

Also provided are methods of purifying tap water containing 1,000 ppm or less NaCl, or seawater containing about 32,000 ppm NaCl, or brackish water containing 2,000 ppm or less NaCl. For tap water, the methods include contacting the tap water with a reverse osmosis membrane, prepared in the presence of a flux enhancing inclusion complex provided herein, at a hydrostatic pressure of about 100 psi or less. For seawater, the methods include contacting the seawater with a reverse osmosis membrane, prepared in the presence of a flux enhancing inclusion complex provided herein, at a hydrostatic pressure of about 800 psi or less. For brackish water, the methods include contacting the brackish water with a reverse osmosis membrane, prepared in the presence of a flux enhancing inclusion complex provided herein, at a hydrostatic pressure of about 225 psi or less. Also provided are reverse osmosis modules that include a reverse osmosis membrane prepared in the presence of a flux enhancing inclusion complex provided herein, wherein the membrane is spirally wound around a central perforated tube. The membrane can exhibit a water flux of from about 30 gfd to about 40 gfd and a salt rejection of from about 96% to about 99.7% when the membrane is exposed to deionized water containing 32,000 ppm NaCl at a temperature of 25° C. and a pressure of 800 psi.

Also provided are processes for preparing a TFC membrane, e.g., a reverse osmosis membrane. An exemplary process includes preparing an aqueous phase containing a polyamine, and preparing an organic phase containing a polyfunctional acid halide and a flux enhancing inclusion complex provided herein. When the aqueous phase and organic phase are brought into contact with each other, interfacial polymerization occurs at the interface between the aqueous phase layer and the organic phase layer to form a discrimination layer. The discrimination layer can be a composite polyamide membrane prepared by coating a porous support membrane with a polyfunctional amine monomer, most commonly coated from an aqueous phase solution. Although water is a preferred solvent, other solvents, such as dimethylformamide (DMF) and acetonitrile can be used. A polyfunctional acid halide subsequently can be applied to the support membrane, typically from an organic phase solution.

In some embodiments, the aqueous phase containing a polyamine is coated first on the porous support to form a coated support membrane, followed by applying the organic phase containing the acyl halide solution and the flux enhancing inclusion complex. The monomers can react when in contact, thereby polymerizing to produce a polymer (e.g., polyamide) discrimination layer at the upper surface of the support membrane. Interfacial polymerization of the polyamine and the polyfunctional acid halide form a discrimination layer thereby forming a reverse osmosis (RO) membrane, where the RO membrane includes the porous support membrane and the discrimination layer. The reverse osmosis membrane prepared by the process can be characterized by having a flux that is greater than the flux of a membrane prepared in the absence of the flux enhancing inclusion complex. In some embodiments, the flux enhancing inclusion complex can be included in the organic phase or in the aqueous phase. In some embodiments, the flux enhancing inclusion complex can be included in the organic phase and the aqueous phase.

In some embodiments, the polyamine used in the process can be selected from the group consisting of diaminobenzene, triaminobenzene, m-phenylene diamine, p-phenylene diamine, 3,5-diaminobenzoic acid, 2,4-diaminotoluene, 2,4-diaminoanisole, xylylene-diamine, ethylenediamine, propylenediamine, piperazine, and tris(2-diaminoethyl)amine. In some embodiments, the polyfunctional acid halide used in the process can be selected from the group consisting of trimesoyl chloride, trimellitic acid chloride, isophthaloyl chloride, and terephthaloyl chloride. The process further can include adding a processing aid selected from among a surfactant, a co-solvent, a drying agent, a catalyst or any combination thereof to the aqueous phase prior to applying the aqueous phase to the porous support membrane. The amount of processing aid in the aqueous phase can be from about 0.001 wt % to about 10 wt % based on the weight of the aqueous phase.

In some embodiments, the processing aid is a surfactant, and can be added to the aqueous phase prior to applying the aqueous phase to the porous support membrane. The surfactant can be selected from among nonionic, cationic, anionic, and zwitterionic surfactants. Exemplary surfactants include polyoxyalkylene ethers, polyoxyethylene alkyl ethers, sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyl-trimethyl ammonium bromide or chloride, hexadecyl-trimethyl ammonium bromide or chloride, and alkyl betaines. Preferred among these are Brij™ 98 nonionic surfactant (polyoxyethylene(20) oleyl ether), SLS, octylphenol ethoxylates, and ethoxylated nonylphenols. When present, the amount of surfactant in the aqueous phase can be from about 0.001 wt % to about 10 wt %, or from about 0.001 wt % to about 1 wt %, or from about 0.005 wt % to about 0.5 wt % based on the weight of the aqueous phase.

The processing aid can include a co-solvent. The co-solvent can be a polar aprotic solvent. Exemplary polar aprotic solvents include dimethylformamide, dimethylacetamide, a dialkyl sulfoxide, tetrahydrofuran, hexamethyl phosphoramide, 1,3-dimethyl-2-imidazolidinone, diethyl ether, N-methyl-2-pyrrolidone, dichloromethane, ethyl acetate, methyl acetate, isopropyl acetate, acetone, methyl ethyl ketone, methyl isobutyl ketone, acetonitrile and any combination thereof In some embodiments, the polar aprotic solvent includes hexamethyl phosphoramide. The hexamethyl phosphoramide can be present in the aqueous phase or organic phase in an amount from about 0.05 wt % to about 1.5 wt %. In some embodiments, the polar aprotic solvent includes a dialkyl sulfoxide. The dialkyl sulfoxide can be present in the aqueous phase or organic phase in an amount from about 0.05 wt % to about 5 wt %.

The processing aid can include a drying agent. A drying agent can be included in order to prevent loss of permeation of the discrimination layer upon drying. Any drying agent that does not interfere with the interfacial polymerization can be used. Exemplary drying agents in a hydrocarbon, an ether, glycerin, citric acid, a glycol, glucose, sucrose, triethylammonium camphorsulfonate, triethyl-ammonium benzene sulfonate, triethylammonium toluenesulfonate, triethylammonium methane sulfonate, ammonium camphor sulfonate, and ammonium benzene sulfonate and any combination thereof When present, a drying agent can be present in the aqueous phase in an amount from about 0.001 wt % to about 10 wt % based on the weight of the aqueous phase.

In the processes provided herein, the aqueous phase or the organic phase or both can include nanoparticles. The nanoparticles can be zeolites or carbon nanoparticles (e.g., fullerenes or carbon nanotubes) or combinations thereof. When present, the nanoparticles can present in the aqueous phase or in the organic phase of both in an amount from about 0.001 wt % to about 0.5 wt % based on the weight of the solution.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is an exemplary embodiment of a wound module.

DETAILED DESCRIPTION

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here , the singular forms "a," "an" and "the" include plural referents unless the context clearly dictates otherwise.

As used herein, ranges and amounts can be expressed as "about" a particular value or range. About also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, $C_1$-$C_x$ includes $C_1$-$C_2$, $C_1$-$C_3$, $C_1$-$C_4$, $C_2$-$C_4$, ... $C_1$-$C_x$.

As used herein, the term "alkyl" refers to a straight, branched, or cyclic chain containing at least one carbon atom and no double or triple bonds between carbon atoms.

As used herein, "inclusion complex" refers to a complex in which a first component (the host component) forms a cavity in which a second component (the guest component) is located.

As used herein, a "guest component" refers to a chemical species at least a portion of which is in the cavity of a host component of an inclusion complex. In the flux enhancing inclusion complexes provided herein, the guest component can include a metal chelate.

As used herein, a "host component" refers to the part of the inclusion complex that forms a cavity. In the flux enhancing inclusion complexes provided herein, exemplary host components are crown ethers and two or more glyme molecules.

As used herein, a "crown ether" refers to macrocyclic polyether molecule containing repeating units of the structure —$CR^c_2$—$CR^c_2O$—, where $R^c$ is H or alkyl, and forming a cavity and capable of containing a guest component in the cavity.

As used herein, "glyme" refers to 1,2-dimethoxyethane, which has the structure:

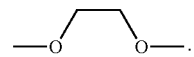

As used herein, "flux" refers to the amount of material that flows through a unit area per unit time, such as the amount of liquid flowing through a given membrane area during a given time. Generally, flux depends on the thickness of the membrane, the feed composition, the temperature of the feed, the downstream vacuum, and the feed-side pressure.

As used herein, a "combination" refers to any association between two items or among more than two items. The association can be spatial or refer to the use of the two or more items for a common purpose.

As used herein, a "flux enhancing inclusion complex" refers to an inclusion complex that improves the water flux of a membrane.

As used herein, a "metal chelate" refers to a combination that includes a metal atom or metal ion and a chelating agent.

As used herein, a "chelating agent" refer to a chemical that can form two or more bonds to a single metal atom or metal ion.

As used herein, a "ligand" refers to a chemical species (such as an ion, molecule or compound) that binds to a metal atom or metal ion to form a coordination complex.

As used herein, a "bidentate ligand" refers to a chelating agent that can form two bonds to a single metal atom or metal ion.

As used herein, the term "surfactant" refers to molecules that absorb at an air/water interface, oil/water interface, and/or oil/air interface, substantially reducing their surface energy. Surfactants generally are classified depending on the charge of the surface active moiety, and can be categorized as cationic, anionic, nonionic and amphoteric surfactants.

As used herein, a "thin film composite membrane" refers to a membrane that has layers of dissimilar materials joined together to form a single membrane.

As used herein, "halogenated" refers to the presence of one or more halogen substituents, such as fluorine, chlorine, bromine, or iodine or any combination thereof. For example, a halogenated $C_1$ alkyl can be any of —$CH_2Cl$, —$CHCl_2$, —$CCl_3$, —$CH_2F$, —$CHF_2$, —$CF_3$, —$CH_2Br$, —$CHBr_2$, —$CBr_3$, —$CH_2I$, —$CHI_2$, or —$CI_3$.

As used herein, the term "contacting" refers to bringing two or more materials into close enough proximity whereby they can interact.

As used herein, "dialkyl sulfoxide" refers to the compound of the structure

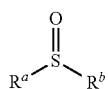

where each of $R^a$ and $R^b$ independently is an alkyl or hydroxyalkyl.

As used herein, "DMSO" refers to dimethyl sulfoxide.
As used herein, "gfd" refers to gallons/ft$^2$/day.

B. Reverse Osmosis

Reference will now be made in detail to an embodiment of the present invention, example of which is illustrated in the accompanying drawings.

The desalination industry faces the problem of achieving high salt rejecting and high flux membranes. These membranes need to have a high salt rejection, be stable over days, weeks or months of operation, and have high flux to work successfully and efficiently. The processes provided herein produce membranes that achieve a high flux and high salt rejection, and the membrane is stable. The processes provided herein include a flux enhancing inclusion complex added to the organic phase or the aqueous phase or both the organic phase and the aqueous phase during membrane production to enhance the polyamide membrane in order to increase flux with negligent negative impact on salt rejection. The flux enhancing inclusion complex provided herein, which can include, e.g., a crown ether or two glyme molecules as a host component, and a metal chelate containing a bidentate ligand and a metal atom or metal ion as the guest component, increases the flux of the membrane more than either component alone modifies the flux of the membrane.

U.S. Pat. No. 6,024,873 describes adding alcohols or ethers to one of the aqueous or organic phases before interfacial polycondensation to form permeable composite reverse osmosis membranes. This patent teaches that the ether can be a crown ether. U.S. Pat. App. Pub. No. 2004/0101760 teaches that glyme, diglyme or triglyme can be used as solvents for preparing membranes. Diketonates and metal additives are described as capable of increasing flux in reverse osmosis membranes (see e.g., U.S. Pat. No. 8,177,978).

C. Flux Enhancing Inclusion Complex

Provided herein is flux enhancing inclusion complex that includes a host component and a guest component. In some embodiments, the host component includes a crown ether. In some embodiments, the host component includes two glyme molecules. The guest component can include a metal chelate containing a bidentate ligand and a metal atom or metal ion. Including the flux enhancing inclusion complex in the organic phase, or in the aqueous phase, or in both the organic phase and the aqueous phase, can result in the formation of a discrimination layer with increased flux, while having negligible negative impact on salt rejection, or improving salt rejection. The flux enhancing inclusion complex provided herein can dissolve in the organic phase. Without being limited by theory, it is believed that the flux enhancing inclusion complexes provided herein can interact with the acyl halide in the organic phase, enabling significant flux enhancement while requiring that relatively only small amounts of the flux enhancing inclusion complex be present during interfacial polymerization.

Membranes prepared using the methods provided herein, which include adding the flux enhancing inclusion complex to the organic phase or the aqueous phase or both the organic phase and aqueous phase during formation of the discrimination layer, can be used under tap water conditions (1,000 ppm salinity or less and about 80 psi or less), standard brackish water conditions (2,000 ppm salinity and 225 psi) as well as under brackish water conditions at low energy (2,000 ppm and 150 psi). Membranes prepared using the methods provided herein also can be used with seawater (32,000 ppm NaCl) and up to pressures of 800 psi.

1. Host Component

The flux enhancing inclusion complex provided herein includes a host component having or forming a cavity. In some embodiments, the host component is a crown ether. Any crown ether having a cavity that can accommodate at least a portion of the guest component can be selected as the host component. Exemplary crown ethers include 12-crown-4, 15-crown-5, 18-crown-6, 20-crown-6, 21-crown-7, and 24-crown-8 and derivatives thereof. Exemplary derivatives include cyclohexyl derivatives, such as dicyclohexyl-18-crown-6, benzo-derivatives, such as dibenzo-18-crown-6, and aza-derivatives such as 1,10-diaza-18-crown-6, 1,7,13-triaza-18-crown-6, and 1,4,10,13-tetraaza-18-crown-6. The crown ethers can be unsubstituted or can be substituted. In some embodiments, the crown ether can include one or more substituents selected from among vinyl, benzo, amido, aryl, thia, aza, alkyl, haloalkyl, and nitro substituents and combinations thereof.

Methods of preparing crown ethers and derivatives thereof are known in the art (e.g., see Krakowiak et al., J Org Chem 54: 4061-4067 (1989); Montgomery, T. N., (1977), *Applications of Crown Ethers in Industrial Anionic Polymerizations*, M.S. Thesis, Georgia Institute of Technology; Yang et al., Chinese J Chem 22: 616-618 (2004); Inoue et al., Bull. Chem. Soc. Jpn. 58: 525-530 (1985); U.S. Pat. Nos. 5,047,563; 5,247,078 and 7,579,463; and 7,989,617; and European Pat. Nos. EP 0176076 B1 and EP 1660884 B1. Crown ethers are commercially available (e.g., from Sigma-Aldrich, St. Louis, Mo.).

When a crown ether is the host component, it generally is present in the flux enhancing inclusion complex provided herein in an amount of about 1 mole of crown ether to about one mole of the guest component. In some embodiments, a metal chelate that contains a bidentate ligand and a metal atom or metal ion is the guest component and a crown ether is the host component.

In some embodiments, the host component comprises at least two glyme molecules. When the host component contains glyme molecules, the glyme generally is present in the flux enhancing inclusion complex provided herein in an amount of about 2 moles of glyme to about one mole of the guest component. In some embodiments, a metal chelate that contains a bidentate ligand and a metal atom or metal ion is the guest component and two glyme molecules form the host component.

As shown in the Examples, adding a crown ether or glyme alone to the organic phase does not result in a membrane with increased flux.

In some embodiments, the aqueous phase can include m-phenyldiamine (MPD), sodium lauryl sulfate (SLS), and triethylamine camphor-sulfonic acid (TEACSA). The aqueous phase also can include hexamethyl-phosphoramide (HMPA). The aqueous phase also can include a dialkyl sulfoxide, such as DMSO. In some embodiments, the aqueous phase includes m-phenyldiamine (MPD), sodium lauryl sulfate (SLS), hexamethyl-phosphoramide (HMPA) and triethylamine camphor-sulfonic acid (TEACSA), and the organic phase includes trimesoyl chloride (TMC), a flux enhancing inclusion complex provided herein and mesitylene in an aliphatic solvent, such as Isopar™ G (petroleum naphtha, low odor, low aromatic $C_{10}$-$C_{12}$ isoalkanes solvent, ExxonMobil, Irving, Tex.).

2. Guest Component

The flux enhancing inclusion complex additives provided herein include as a guest component a metal chelate containing a bidentate ligand and a metal atom or metal ion. Any bidentate ligand that can form a complex with a metal atom or metal ion can be used in the metal chelate. A bidentate ligand can be a Lewis base that can donate electrons to a metal atom or metal ion. Exemplary bidentate ligands include:

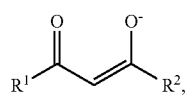

Formula 1

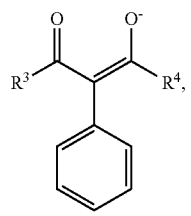

Formula 2

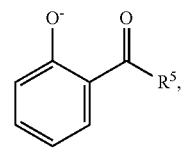

Formula 3

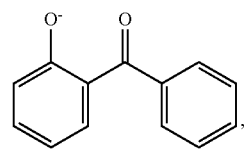

Formula 4

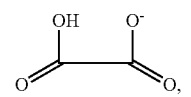

Formula 5

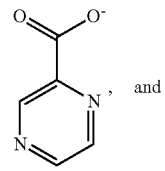

Formula 6 and

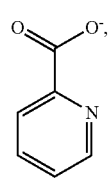

Formula 7 where each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered or 6-membered aromatic ring, an aromatic bicyclic ring system containing two fused 6-membered rings, and an aromatic bicyclic ring system containing a 5-membered ring fused to a 6-membered aromatic ring. Each of $R^1$, $R^2$, $R^3$, $R^4$ and $R^5$ separately can be selected from among $C_1$-$C_6$ alkyl and halogenated $C_1$-$C_6$ alkyl. Any one of $R^1$, $R^2$, $R^3$, $R^4$ or $R^5$ can be selected from among phenyl, benzyl, a $C_1$-$C_5$ aromatic ring containing 1 to 4 hetero atoms selected from among N, O and S, and a $C_5$-$C_9$ bicyclic aromatic ring system containing 1 to 4 hetero atoms selected from among N, O and S. Any one of $R^1$, $R^2$, $R^3$, $R^4$ or $R^5$ can be selected from among furanyl, pyrrolyl, thiopheneyl, imidazolyl, pyrazolyl, oxazolyl, isoxazolyl, thiazolyl, phenyl, pyridinyl, pyrazinyl, pyrimidinyl, pyridazinyl, purinyl, benzoxazolyl, benzothiazolyl, benzisoxazolyl, benzimidazolyl, benzothiopheneyl, indazolyl, benzo[c]-thiopheneyl, isoindolyl, isobenzofuranyl, naphthaleneyl, quinolinyl, quinoxalinyl, quinazaolinyl, and isoquinolinyl.

Among the preferred bidentate ligands are the unsubstituted and halogen-substituted beta-diketonates of Formula 1, such as an acetylacetonate ion (often abbreviated as "acac" and also known as pentane-2,4-dionate) or halogenated acetylacetonate ion. One or more bidentate ligands can interact with a metal ion to form a metal chelate. For example, when the metal ion is an alkaline earth metal, two bidentate ligands can interact with the metal atom or metal ion to form a metal chelate. Exemplary metal chelates include i) two acetylacetonate ligands and a Ca atom; ii) two fluoroacetylacetonate ligands and a Ca atom; and iii) two oxalate ligands and a Ca atom.

In some embodiments, the metal complex includes an unsubstituted or halogen-substituted beta-diketonate. Exemplary beta-diketonate ligands include pentane-2,4-dionate (acetylacetonate, often abbreviated as "acac"), 1,5-difluoropentane-2,4-dionate, 1,1,5,5-tetrafluoropentane-2,4-dionate, 1,1,1,5,5,5-hexafluoro-pentane-2,4-dionate, propane-1,3-dionate, butane-1,3-dionate, 4-fluorobutane-1,3-dionate, 4,4-difluorobutane-1,3-dionate, 4,4,4-trifluorobutane-1,3-dionate, heptane-3,5-dionate, 1-fluorohexane-2,4-dionate, 1,5-difluoropentane-2,4-dionate, 1,1,5-trifluoropentane-2,4-dionate, 1,1,5,5-tetrafluoro-pentane-2,4-dionate, 1,1,1,5,5-pentafluoropentane-2,4-dionate, 1,1,1,5,5,5-hexafluoropentane-2,4-dionate and octane-3,5-dionate ligands.

The ligand can be bound to any element selected from Groups 2-15 of the Periodic Table (IUPAC) to form the chelate. In some embodiments, the ligand is bound to an element selected from among Groups 3-15 and Rows 3-6 of the Periodic Table (IUPAC), preferably Groups 3-14 and Rows 3-6 of the Periodic Table. In some embodiments, the ligand is bound to a metal atom or metal ion selected from among the group consisting of aluminum, beryllium, cadmium, calcium, cerium, chromium, cobalt, copper, dysprosium, erbium, gallium, hafnium, indium, iron, lithium, magnesium, manganese, molybdenum, neodymium, nickel, palladium, potassium, praseodymium, ruthenium, samarium, scandium, sodium, strontium, terbium, tin, vanadium, yttrium, ytterbium, zinc and zirconium. In some embodiments, the metal atom or metal ion can be a Group 2 (alkaline earth, such as beryllium (Be), magnesium (Mg), calcium (Ca), strontium (Sr), and barium (Ba)), or Group 13 (aluminum (Al), gallium (Ga), indium (In) or thallium (Tl)) metal ion or metal atom.

In some embodiments, the metal atom or metal ion is selected from among those metals where the size of the metal atom is from about 130 pm to about 220 pm. In some embodiments, the metal atom or metal ion is selected from among those metals where the size of the metal ion is from about 80 pm to about 170 pm. In some embodiments, the metal atom or metal ion is selected to have a crystal ionic radius of from about 0.5 nm to about 1.85 nm. In some embodiments, the metal atom or metal ion is selected to have an ionic radius of from about 0.45 nm to about 1.75 nm. Values for exemplary metals are shown in Table 1. Each metal shows a range of radii, which depend on degree of coordination.

TABLE 1

Ionic radii of exemplary metals.

| Metal | Crystal ionic radius (nm) | Ionic radius (nm) |
| --- | --- | --- |
| Ga | 0.61-0.76 | 0.47-0.62 |
| Mg | 0.71-1.03 | 0.57-0.89 |
| Ca | 1.14-1.48 | 1.0-1.34 |
| Sr | 1.32-1.58 | 1.18-1.44 |
| Ba | 1.49-1.75 | 1.35-1.61 |
| Al | 0.53-0.68 | 0.39-0.54 |
| Ga | 0.61-0.76 | 0.47-0.62 |
| V | 0.49-0.93 | 0.35-0.79 |
| In | 0.76-1.06 | 0.62-0.92 |
| Th | 0.89-1.84 | 0.75-1.70 |
| Cu | 0.60-0.91 | 0.46-0.73 |
| Y | 1.04-1.22 | 0.9-1.08 |
| Cd | 0.92-1.45 | 0.78-1.31 |
| Hf | 0.72-0.97 | 0.58-0.83 |
| Zn | 0.74-1.04 | 0.6-0.9 |

The data of Table 1 has been extracted from the Database of Ionic Radii, available at http://abulafia.mt.ic.ac.uk/shannon/ptable.php. Additional information on ionic radii is provided in "Revised Effective Ionic Radii and Systematic Studies of Interatomic Distances in Halides and Chalcogenides" By R. D. Shannon, Acta Crystallographica. (1976). A32: 751-767; and in Shannon et al., Acta Cryst. B25, 925-946 (1969).

Metal chelates containing bidentate ligands and metal atoms or metal ions are well known in the art, as are methods for forming the metal chelates (e.g., see U.S. Pat. Nos. 3,231,597; 3,291,660; and 7,282,573; and international patent application published as WO 2004/056737, the disclosures of each of which are incorporated by reference). For example, metal acetylacetonates can be formed by the reaction of excess acetylacetone or a solution of a solid salt of it in an inert solvent followed by refluxing with the metal oxide, hydroxide, carbonate or basic carbonate of the metal. Metal acetylacetonates also can be prepared in nonaqueous solution by the reaction of metal salt and acetylacetone if the metal salts are soluble in the nonaqueous solvent. Metal acetylacetonates also can be formed by the reaction of acetylacetone with a metal oxide, hydroxide, carbonate or basic carbonate in aqueous solution, with or with pH control or added heat. Metal acetylacetonates also can be prepared in an anhydrous inert medium containing the ligand and metal, particularly alkali metals and alkaline earth metals.

Any of these synthesis techniques can be used to prepare the metal chelates of the flux enhancing inclusion complexes provided herein.

In some embodiments, preferred species of metal chelates containing a bidentate ligand and a metal atom or metal ion include $Al(acac)_3$, $Al(F6acac)_3$, $Ba(acac)_2$, $Ba(F6acac)_2$, $Be(acac)_2$, $Be(F6acac)_2$, $Ca(acac)_2$, $Ca(F6acac)_2$, $Cd(acac)_2$, $Cd(F6acac)_2$, $Ce(acac)_3$, $Ce(F6acac)_3$, $Cr(acac)_3$, $Co(acac)_3$, $Cu(acac)_2$, $Cu(F6acac)_2$, $Dy(acac)_3$, $Er(acac)_3$, $Fe(acac)_2$, $Fe(acac)_3$, $Ga(acac)_3$, $Hf(acac)_4$, $In(acac)_3$, $K(acac)$, $Li(acac)$, $Mg(acac)_2$, $Mg(F6acac)_2$, $Mn(acac)_2$, $Mn(acac)_3$, $MoO_2(acac)_2$, $MoO_2(F6acac)_2$, $Na(acac)$, $Nd(acac)_3$, $Nd(F6acac)_3$, $Ni(acac)_2$, $Ni(F6acac)_2$, $Pd(acac)_2$, $Pr(acac)_3$, $Pr(F6acac)_3$, $Ru(acac)_3$, $Ru(F6acac)_3$, $Sc(acac)_2$, $Sc(F6acac)_2$, $Sm(acac)_3$, $Sn(acac)_2$, $Sn(acac)_2Cl_2$, t-butyl-$Sn(acac)_2$, t-butyl-$Sn(acac)_2Cl_2$, $Sn(F6acac)2$, $Sr(acac)_2$, $Sr(F6acac)_2$, $Tb(acac)_3$, $V(acac)_3$, $Y(acac)_3$, $Y(F6acac)_3$, $Zn(acac)_2$, $Zn(F6acac)_2$, and $Zr(acac)_4$, where F6acac refers to 1,1,1,5,5,5-hexafluoropentane-2,4-dionate or 1,1,1,5,5,5-hexafluoroacetyl-acetonate.

The flux enhancing inclusion complexes provided herein generally contain one species of metal chelate containing a bidentate ligand and a metal atom or metal ion as the guest component, and either a crown ether or at least two glyme molecules as the host component. Combinations of flux enhancing inclusion complexes can be used. For example, two or more flux enhancing inclusion complexes that include different host components can be used in combination. Two or more flux enhancing inclusion complexes that include the same host component but different guest components can be used in combination.

The flux enhancing inclusion complex provided herein generally is added to the organic phase prior to the interfacial polymerization forming the discrimination layer. The flux enhancing inclusion complex can be added with the other components of the organic phase in any order. The flux enhancing inclusion complex provided herein can be added to the aqueous phase prior to the interfacial polymerization, or can be added to the organic phase and the aqueous phase prior to the interfacial polymerization.

The amount of flux enhancing inclusion complex provided herein present in the organic phase, or in the aqueous phase, or in the organic phase and the aqueous phase, is from about 0.001 wt % to about 1 wt %. In some embodiments, the flux enhancing inclusion complex is present in an amount of about 0.001 wt %, 0.0025 wt %, 0.005 wt %, 0.0075 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.6 wt %, 0.7 wt %, 0.8 wt %, 0.9 wt %, or 1 wt % based on the weight of the organic phase or the aqueous phase, or an amount in a range of at or about a to at or about b, where a is any one of the preceding wt % values of flux enhancing inclusion complex, and b is any one of the preceding wt % values of flux enhancing inclusion complex that is >a, such as from about 0.0025 wt % to about 0.2 wt %, or from about 0.005 wt % to about 0.5 wt %, or from about 0.002 wt % to about 0.2 wt %, etc. In some embodiments, the flux enhancing inclusion complex is present in the organic phase in an amount of from about 0.001 wt % to about 0.5 wt %.

D. Other Additives

In the processes provided herein, the aqueous phase or the organic phase or both used during interfacial polymerization can include additives. Exemplary additives include nanoparticles, carriers including insoluble carriers, and processing aids, such as surfactants, co-solvents such as polar aprotic solvents, drying agents, catalysts, co-reactants, or any combination thereof. Drying agents can include, e.g., hydrophobic organic compounds, such as a hydrocarbon or an ether, glycerin, citric acid, glycols, glucose, sucrose, triethylammonium camphorsulfonate, triethylammonium benzene sulfonate, triethylammonium toluenesulfonate, triethylammonium methane sulfonate, ammonium camphor sulfonate, and ammonium benzene sulfonate and those described in U.S. Pat. Nos. 4,855,048; 4,948,507; 4,983,291; and 5,658,460. Anti-oxidants, ultraviolet adsorbers and/or quenchers, light stabilizers, or free radical scavengers or any combination thereof also can be included in the aqueous phase or organic phase, or both. Examples include triazine derivatives, benzoxazinones, hydroxy-substituted benzophenones, hydroxy-substituted benzotriazoles, nickel complexes, phosphite anti-oxidants, sulfur anti-oxidants, formamidines and oxamide derivatives. Examples include Tinuvin® 123, 144, 292, 622, 770 (hindered amine light stabilizers, Ciba Specialty Chemicals, Tarrytown, N.Y.), Tinuvin® 328, 384, 900 and 1130 (UV absorbers, Ciba Specialty Chemicals, Tarrytown, N.Y.), Irganox® 1010, 1035, 1076 and 1098 (phenolic anti-oxidants, manufactured by Ciba Specialty Chemicals, Tarrytown, N.Y.), PEP-8 (alkyl phosphite anti-oxidant, Amfine Chemical Corporation, Upper Saddle River, N.J.), HP-10 and PEP 36A (alkylaryl phosphite anti-oxidants, Amfine Chemical Corporation, Upper Saddle River, N.J.), AO-26 and A)-412S (thioether anti-oxidants, Amfine Chemical Corporation, Upper Saddle River, N.J.), BNX® DSTDP (thioether anti-oxidant, Mayzo, Inc., Suwanee, Ga.), butylhydroxytoluene, butylated hydroxyanisole, trihydroxybutyrophenol, ethoxyquin, tertiary butylhydroxyquinone, gallic acid and its derivatives (propyl, octyl, and dodecyl esters), ascorbic acid and its derivatives, erythorbic acid and its derivatives, hydroxycinnamic acids, hydroxybenzoic acids, phenylpropanoids, tocopherols, tocotrienols, dithioerythritol, and di-tert-butylhydroquinone. For example, Irganox® 1010 (a sterically hindered phenolic anti-oxidant, CAS No. 6683-19-8 from BASF Schweiz AG, Basel, Switzerland) can be included in the organic phase.

1. Nanoparticles

In some embodiments, nanoparticles or carriers can be included in the TFC membrane. The nanoparticles or relatively insoluble carriers or both can be processed using shear, cavitation, or impact forces prior to addition to the aqueous phase or organic phase or both. The nanoparticles or carriers also can be calcined for at least 1 hour at 200° C. or more prior to use. Carriers also can be processed by subjecting them to ultrasonic energy prior to use.

The nanoparticles or carriers can be processed to adjust the pH prior to use. For example, the nanoparticles or carriers or both can be processed in a solution at a pH lower than about 6 for at least 30 seconds or at a pH lower than about 5 for at least 30 seconds. The nanoparticles or carriers can be processed in a solution at a pH greater than about 8 for at least 30 seconds or in a solution at a pH greater than about 9 for at least 30 seconds. The nanoparticles or carriers or both also can be processed with heat in a solution for at least 5 minutes at a temperature of 40° C. or more.

Nanoparticles or carriers can be included in the support layer, the organic phase or layer, the aqueous layer, both the aqueous layer and the organic layer, or in support layer, the aqueous layer and the organic layer. Nanoparticles or carriers also can be present in the water wetted surface of the support membrane prior to interfacial polymerization between the monomers in the aqueous layer and the monomers in the organic layer. Nanoparticles, such as zeolites, particularly LTA, can be added to support membrane to improve functionality, e.g., by making the membrane more resistant to compaction.

Nanoparticles or carriers can include a metal particle, such as gold, silver, copper, zinc, titanium, iron, aluminum, zirconium, indium, tin, magnesium, or calcium or an alloy thereof or an oxide thereof or a combination thereof. They can also be a nonmetallic species such as $Si_3N_4$, SiC, BN, $B_4C$, or TiC or an alloy thereof or a combination thereof. They can be a carbon-based species such as graphite, carbon glass, a carbon cluster of at least $C_2$, a carbon nanotube, a carbon nanoparticle, a buckminster-fullerene, a higher fullerene, or a combination thereof, such as those described in U.S. Pat. Nos. 5,641,466; 6,783,745; 7,078,007; 7,422,667; 7,648.765; 7,816,564; 8,173,211; and 8,828,533.

Suitable zeolites for use as nanoparticles include LTA (Linde Type A), LTL (Linde Type L), OFF (offretite), RHO, PAU, and KFI. Such zeolites have different Si/Al ratios, and exhibit different characteristic charge and hydrophilicity and can therefore be selected to be included in RO membranes in different circumstances. Nanoparticles also can include zeolite precursors or amorphous aluminosilicates.

Zeolites can be crystalline aluminosilicates with fully cross-linked, open framework structures made up of corner-sharing $SiO_4$ and $AlO_4$ tetrahedra. A representative empirical formula of a zeolite is $M_{2/n}O.Al_2O_3xSiO_2yH_2O$ where M represents the exchangeable cation of valence n. M is generally a Group I or II ion, although other metal, non-metal, and organic cations can also balance the negative charge created by the presence of Al in the structure. The framework can contain interconnected cages and channels of discrete size, which can be occupied by water. In addition to $Si^{4+}$ and $Al^{3+}$, other elements can also be present in the zeolitic framework. They need not be isoelectronic with $Si^{4+}$ or $Al^{3+}$, but are able to occupy framework sites. Aluminosilicate zeolites typically display a net negative framework charge, but other molecular sieve frameworks can be electrically neutral.

Aluminosilicate zeolites with a Si:Al ratio less than 1.5:1 are preferred. Other preferred minerals include Aluminite, Alunite, Ammonia Alum, Anauxite, Apjohnite, Basaluminite, Batavite, Bauxite, Beidellite, Boehmite, Cadwaladerite, Cardenite, Chalcoalumite, Chiolite, Chloraluminite, Cryolite, Dawsonite, Diaspore, Dickite, Gearksutite, Gibbsite, Halloysite, Hydrobasaluminite, Hydrocalumite, Hydrotalcite, Illite, Kalinite, Kaolinite, Mellite, Montmorillonite, Natroalunite, Nontronite, Pachnolite, Prehnite, Prosopite, Ralstonite, Ransomite, Saponite, Thomsenolite, Weberite, Woodhouseite, and Zincaluminite and combinations thereof.

Zeolites and other inorganic mineral compounds also can be selected based on the degree of crystallization. Amorphous portions of the nanoparticle are typically more soluble than crystalline portions of the nanoparticle and processing can increase solubility. The amount of crystalline material can be determined through several techniques including x-ray crystallography. The nanoparticles can have a structure with greater than 0.5%, 1% or 5% amorphous material by mass within the particle and may have a surface containing at least 40% of aluminum atoms or oxygen atoms directly bound to aluminum atoms.

Minerals that have cage-like framework structures similar to zeolites or have similar properties include the phosphates: kehoeite, pahasapaite and tiptopite; and the silicates: hsianghualite, lovdarite, viseite, partheite, prehnite, roggianite, apophyllite, gyrolite, maricopaite, okenite, tacharanite and tobermorite. Accordingly, minerals similar to zeolites also can be molecular sieves based on $AlPO_4$. These alumino-phosphates, silicoalumino-phosphates, metalloalumino-phosphates and metallosilicoalumino-phosphates are denoted as $AlPO_{4-n}$, $SAPO_{-n}$, $MeAPO_{-n}$ and $MeAPSO_{-n}$, respectively, where n is an integer indicating the structure type. $AlPO_4$ molecular sieves can have the structure of known zeolites or other structures. When Si is incorporated in an $AlPO_{4-n}$ framework, the product can be known as SAPO. MeAPO or MeAPSO sieves are can be formed by the incorporation of a metal atom (Me) into an $AlPO_{4-n}$ or SAPO framework. Exemplary metal atoms include Li, Be, Mg, Co, Fe, Mn, Zn, B, Ga, Fe, Ge, Ti, and As.

Most substituted $AlPO_{4-n}$'s have the same structure as $AlPO_{4-n}$, but several new structures are only found in SAPO, MeAPO and MeAPSO materials. Their frameworks typically carry an electric charge.

Non-zeolite nanoparticles and or other relatively insoluble carriers can be selected from a list of inorganic mineral compounds that have a solubility product such that preferred concentrations of dissolved molecular additives can be achieved. For many compounds, these solubility products ($K_{sp}$) are well known. For compounds where these are not known experimentally, molecular additive releasing or other relatively insoluble carriers also can be selectable by their counter ion. In such cases, compounds can be selected based on the presence of sulfate, hydroxide or oxide counter-ions. Solubility of these non-zeolite nanoparticles or other relatively insoluble carriers can be enhanced using processing.

Particle size is often described in terms of average hydrodynamic diameter, assuming a spherical shape of the nanoparticles or carriers. The nanoparticle carrier can have an average hydrodynamic diameter of from about 0.1 nm to about 1000 nm, from about 10 nm to about 1000 nm, from about 20 nm to about 1000 nm, from about 50 nm to about 1000 nm, from about 0.11 nm to about 500 nm, from about 10 nm to about 500 nm, from about 50 nm to about 250 nm, from about 200 nm to about 300 nm, or from about 50 nm to about 500 nm.

The nanoparticles or carriers can be dispersed in a solution compatible with the aqueous or polar solvent that will be used during interfacial polymerization. In some applications, water can be used as both the dispersion solvent for the nanoparticles or carriers and as the aqueous solvent for use during the interfacial polymerization. This dispersion largely includes isolated and individual nanoparticles or carriers. Suitable methods for dispersion include stirring, ultrasonication, shaking, use of surfactants or co-solvents, use of a Microfluidizer™ high shear fluid processors (Microfluidics Corp., Westwood, Mass., USA), use of a homogenizer, use of a mortar and pestle, use of a ball mill or use of a jar mill. In some applications, some of the nanoparticles or carriers may still be associated with other nanoparticles or carrier particles as aggregates. These aggregates can be left in solution, or can removed by a suitable technique, such as filtration.

When present, the amount of nanoparticles in the aqueous phase is from about 0.001 wt % to about 0.5 wt % based on the weight of the aqueous phase. In some embodiments, the aqueous phase contains an amount of nanoparticles from about 0.005 wt % to about 0.1 wt % based on the weight of the aqueous phase.

2. Processing Aids

In some embodiments, the additives can be processing aids, such as surfactants, co-solvents such as polar aprotic solvents, drying agents, catalysts, co-reactants, or any combination thereof. When present, a processing aid can be present in the aqueous phase in an amount from about 0.001 wt % to about 10 wt % based on the weight of the aqueous phase.

a. Surfactants

In some embodiments, the aqueous phase used during interfacial polymerization can include a surfactant or a combination of surfactants. The surfactants can, e.g., help the aqueous phase wet the support layer or can help in the dispersion of materials, e.g., nanoparticles, in the aqueous phase. The surfactant(s) can be selected from among non-ionic, cationic, anionic, and zwitterionic surfactants depending on the chemistry of the other additives. For example, a cationic surfactant would not be selected when anionic additives are being used. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyl-trimethyl ammonium bromide or chloride, hexadecyl-trimethyl ammonium bromide or chloride, and alkyl betaines. Preferred among these are SLS, octyl-phenol ethoxylates, and ethoxylated nonylphenols.

When present, the amount of surfactant in the aqueous phase is from about 0.001 wt % to about 10 wt %, or about 0.001 wt % to about 1 wt %, or about 0.005 wt % to about 0.5 wt % based on the weight of the aqueous phase. In some embodiments, the aqueous phase contains no surfactant. In some embodiments, the aqueous phase contains an amount of surfactant from about 0.01 wt % to about 0.1 wt % based on the weight of the aqueous phase.

b. Triethylammonium Camphorsulfonate (TEACSA)

In some embodiments, the aqueous phase used during interfacial polymerization can include triethylammonium camphorsulfonate (TEACSA). When present, the TEACSA is present in an amount from about 4 wt % to about 10 wt % based on the weight of the aqueous phase. In some embodiments, the TEACSA is present in the aqueous phase in an amount from about 5 wt % to about 7.5 wt %. In some embodiments, the amount of TEACSA in the aqueous phase is about 4 wt %, 4.25 wt %, 4.5 wt %, 4.75 wt %, 5 wt %, 5.25 wt %, 5.5 wt %, 5.75 wt %, 6 wt %, 6.25 wt %, 6.5 wt %, 6.75 wt %, 7 wt %, 7.25 wt %, 7.5 wt %, 7.75 wt %, 8 wt %, 8.25 wt %, 8.5 wt %, 8.75 wt %, 9 wt %, 9.25 wt %, 9.5 wt %, 9.75 wt %, or 10 wt % based on the weight of the aqueous phase, or an amount in a range of at or about c to at or about d, where c is any one of the preceding wt % values of TEACSA, and d is any one of the preceding wt % values of TEACSA that is >c, such as from about 5 wt % to about 10 wt %, or from about 4.25 wt % to about 7.75 wt %, or from about 5 wt % to about 7 wt %, etc. In some embodiments, the TEACSA is present in the aqueous phase in an amount of about 6.75 wt %.

c. Polar Aprotic Solvents

In some embodiments, the aqueous phase used during interfacial polymerization can include one or more polar aprotic solvents. Any polar aprotic solvent compatible with the other components can be selected. Exemplary polar aprotic solvents include dimethylformamide, dimethylacetamide, dialkyl sulfoxides, tetrahydrofuran, hexamethyl phosphoramide (HMPA), 1,3-dimethyl-2-imidazolidinone, diethyl ether, N-methyl-2-pyrrolidone, dichloromethane, ethyl acetate, methyl acetate, isopropyl acetate, acetone, methyl ethyl ketone, methyl isobutyl ketone, and acetonitrile and mixtures thereof. In some embodiments, the polar aprotic solvent included in the aqueous phase is hexamethyl phosphoramide.

In some embodiments, the polar aprotic solvent includes a dialkyl sulfoxide. The dialkyl sulfoxide can be of the formula:

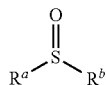

where each of $R^a$ and $R^b$ independently is selected from among a $C_1$-$C_{25}$ alkyl and a $C_1$-$C_{20}$ hydroxyalkyl. The alkyl or hydroxyalkyl can be linear or branched, and when C3 or larger can be a cyclic. In some embodiments, each of $R^a$ and $R^b$ independently is selected from among a $C_1$-$C_{10}$ alkyl and a $C_1$-$C_{10}$ hydroxyalkyl. In some embodiments, each of $R^a$ and $R^b$ independently is selected from among a $C_1$ alkyl, $C_2$ alkyl, $C_3$ alkyl, $C_4$ alkyl, $C_5$ alkyl and $C_6$ alkyl. Exemplary sulfoxides include, but are not limited to, dimethyl sulfoxide, diethyl sulfoxide, methyl ethyl sulfoxide, dipropyl sulfoxide, diisopropyl sulfoxide, di-n-pentyl sulfoxide, di-n-hexyl sulfoxide, di-(2-methyl-pentyl)sulfoxide, dioctyl sulfoxide, methyl octylsulfoxide, ethyl octyl sulfoxide, 2-hydroxyethyl hexyl sulfoxide, 2-hydroxyethyl heptyl sulfoxide, 2-hydroxyethyl octyl sulfoxide, 2-hydroxyethyl nonyl sulfoxide, 2-hydroxyethyl decyl sulfoxide, 2-hydroxy-ethyl undecyl sulfoxide, 2-hydroxyethyl dodecyl sulfoxide, 2-hydroxyethyl tridecyl sulfoxide, 2-hydroxyethyl tetradecyl sulfoxide, 2-hydroxyethyl pentadecyl sulfoxide, 2-hydroxyethyl hexadecyl sulfoxide, 2-hydroxyethyl heptadecyl sulfoxide, 2-hydroxyethyl octadecyl sulfoxide, 2-hydroxyethyl nondecyl sulfoxide, 2-hydroxyethyl eicosyl sulfoxide, 2-hydroxyethyl heneicosyl sulfoxide, 2-hydroxyethyl docosyl sulfoxide, 2-hydroxypropyl hexyl sulfoxide, 2-hydroxypropyl heptyl sulfoxide, 2-hydroxypropyl octyl sulfoxide, 2-hydroxypropyl nonyl sulfoxide, 2-hydroxypropyl decyl sulfoxide, 2-hydroxypropyl undecyl sulfoxide, 2-hydroxypropyl dodecyl sulfoxide, 2-hydroxypropyl tridecyl sulfoxide, 2-hydroxypropyl tetradecyl sulfoxide, 2-hydroxypropyl pentadecyl sulfoxide, 2-hydroxypropyl hexadecyl sulfoxide, 2-hydroxypropyl heptadecyl sulfoxide, 2-hydroxypropyl octadecyl sulfoxide, 2-hydroxypropyl nondecyl sulfoxide, 2-hydroxy-propyl eicosyl sulfoxide, 2-hydroxypropyl heneicosyl sulfoxide, 2-hydroxypropyl docosyl sulfoxide, 3-hydroxypropyl hexyl sulfoxide, 3-hydroxypropyl dodecyl sulfoxide, 3-hydroxypropyl hexadecyl sulfoxide, 2-hydroxy-2-methylpropyl dodecyl sulfoxide, 2-hydroxy-2-methyl-dodecyl dodecyl sulfoxide, 2-hydroxy-2-octyl-dodecyl dodecyl sulfoxide, bis (2-hydroxyethyl) sulfoxide, bis(2-hydroxydodecyl) sulfoxide, 2-hydroxy-ethyl 2-hydroxypropyl sulfoxide, 2-hydroxyethyl 2-hydroxy-dodecyl sulfoxide, 2-hydroxy-ethyl 5-hydroxypentyl sulfoxide, 2-hydroxycyclohexyl dodecyl sulfoxide, 2-hydroxy-cyclohexyl dodecyl sulfoxide, dicyclohexyl sulfoxide, cyclopentyl methyl sulfoxide, cyclopentyl ethyl sulfoxide, and cycloheptyl propyl sulfoxide and combinations thereof. A mixture of two or more sulfoxides can be used. In some embodiments, the polar aprotic solvent includes a combination comprising a dialkyl sulfoxide and hexamethyl phosphoramide. In some embodiments, the organic phase includes a combination comprising DMSO and hexamethyl phosphoramide.

In some embodiments, at least one of $R^a$ and $R^b$ is a $C_1$-$C_{25}$ alkyl. In some embodiments, at least one of $R^a$ and $R^b$ is a $C_1$-$C_{20}$ hydroxyalkyl. In some embodiments, each of $R^a$ and $R^b$ is a $C_1$-$C_{25}$ alkyl. In some embodiments, at least one of $R^a$ and $R^b$ is a $C_1$-$C_{10}$ alkyl. In some embodiments, each of $R^a$ and $R^b$ is a $C_1$-$C_{10}$ alkyl. In some embodiments, the dialkyl sulfoxide is a di-($C_1$-$C_6$-alkyl)-sulfoxide. In some embodiments, dimethylsulfoxide and diethyl sulfoxide are preferred.

In some embodiments, the amount of polar aprotic solvent included in the aqueous phase is from about 0.05 wt % to about 5 wt %. In some embodiments, the amount of polar aprotic solvent included in the aqueous phase is from about 0.1 wt % to about 1 wt %. In some embodiments, the amount of polar aprotic solvent present in the aqueous phase is about 0.05 wt %, 0.1 wt % , 0.125 wt %, 0.15 wt %, 0.175 wt %, 0.2 0.225 wt %, 0.25 wt %, 0.275 wt %, 0.3 wt %, 0.325 wt %, 0.35 wt %, 0.375 wt %, 0.4 wt %, 0.425 wt %, 0.45 wt %, 0.475 wt %, 0.5 wt %, 0.525 wt %, 0.55 wt %, 0.575 wt %, 0.6 wt %, 0.625 wt %, 0.65 wt %, 0.675 wt %, 0.7 wt %, 0.725 wt %, 0.75 wt %, 0.775 wt %, 0.8 wt %, 0.825 wt %, 0.85 wt %, 0.875 wt %, 0.9 wt %, 0.925 wt %, 0.95 wt %, 0.975 wt %, 1 wt %, 1.5 wt %, 2 wt %, 2.5 wt %, 3 wt %, 3.5 wt %, 4 wt %, 4.5 wt % or 5 wt % based on the weight of the aqueous phase, or an amount in a range of at or about e to at or about f, where e is any one of the preceding wt % values of polar aprotic solvent, and f is any one of the preceding wt % values of polar aprotic solvent that is >e, such as from about 0.15 wt % to about 1.5 wt %, or from about 0.35 wt % to about 3.5 wt %, or from about 0.25 wt % to about 0.75 wt %, etc. In some embodiments, the polar aprotic solvent is hexamethyl phosphoramide and is present in the aqueous phase or organic phase in an amount from about 0.25 wt % to about 5 wt % based on the weight of the aqueous phase or the organic phase.

Other co-solvents can be included. Examples of other co-solvents include, but are not limited to, ethanol, propanol, isopropanol, butanol, ethylene glycol, propylene glycol, glycerol and mixtures thereof with water, either individually or in any combination thereof. In some embodiments, the total amount of co-solvent present in the aqueous phase is in the range of from about 0.05 wt % to about 10 wt %, or from about 0.1 wt % to about 5 wt %, or from about 0.1 wt % to about 1 wt %.

E. Preparation Of TFC Membranes

Thin film composite (TFC) membranes can be used in nanofiltration, reverse osmosis (RO) and forward osmosis (FO) applications. For RO applications, the membranes include a support layer, which is preferably porous. The support layer can by hydrophilic or hydrophobic. In some applications, the support layer is hydrophilic. The TFC membrane also includes at least one a discrimination layer on a surface of the support layer. The TFC membrane can include an anti-fouling layer deposited on either or both surfaces of the TFC membrane. The TFC membrane also can include a protective layer deposited on either or both surfaces of the TFC membrane or on an anti-fouling layer. For example, to prevent scratching of the membrane surface or alter adsorption, a hydrophilic polymer layer can be applied to the surface of the discrimination layer or the anti-fouling layer. For example, a solution of polyvinyl alcohol in water can be applied to the surface of the discrimination layer followed by application of heat to provide a heat cure of the hydrophilic polymer layer.

1. Support Layer

The support layer typically includes a polymeric microporous support membrane, which in turn is often supported by a non-woven or woven mesh fabric to improve handling properties of the membranes or for mechanical strength or both. The support layer can include a polysulfone or other suitably porous membrane, such as a membrane containing polyethersulfone, poly(ether sulfone ketone), poly(ether ethyl ketone), poly(phthalazinone ether sulfone ketone), polyacrylonitrile, polyvinyl chloride, polyester, polystyrene, polysulfone, polypropylene, cellulose nitrate, cellulose acetate, cellulose diacetate, or cellulose triacetate. The support layer typically is about 25 to 250 microns in thickness. The support layer is porous, and often the smallest pores of the support layer are located very near the upper surface. Porosity at the surface can be low, for instance from 5-15%, of the total surface area.

The support membrane is typically a polymeric microporous support membrane, which in turn is supported by a non-woven or woven fabric for mechanical strength. The fabric is preferably a polyester fabric having a basis weight of 60-120 grams per meter or gsm, and a thickness of 50-200 microns. The support membrane can be made from polysulfone or other suitable porous membranes, such as polyethersulfone, poly(ether sulfone ketone), poly(ether ethyl ketone), poly(phthalazinone ether sulfone ketone), polyacrylonitrile, polypropylene, cellulose acetate, cellulose diacetate, or cellulose triacetate. The support membrane can be 25-100 µm in thickness, preferably about 35 µm to about 75 µm and most preferably about 50 µm in thickness, and can have the smallest pores located very near the upper surface. Porosity at the surface can be low, for instance from 5-15% of the total surface area.

The preparation of the support layer can include spraying or casting a polymer solution onto a woven or non-woven fabric layer. Exemplary processes known in the art to form the support layer are disclosed, e.g., in U.S. Pat. Nos. 3,926,798; 4,039, 440; 4,337,154; and 8,177,978; and in U.S. Patent Application Publication Nos. 2011/0174728 and 2014/0014575, the disclosure of each of which is incorporated herein by reference. One or more than one reinforcing fabric layer of a woven or nonwoven material or a combination thereof, and made up of polymeric fibers, can be included in the TFC membrane. When present, the fabric layer preferably is permeable to water, flat, and without stray fibers that could penetrate the support layer or the discrimination layer. The fabric layer generally is thin to decrease cost and to maximize membrane area, is resistant to extensional forces, and is mechanically resistant to deformation at high pressures.

The preparation of the support layer generally includes the addition of N-methylpyrrolidone (NMP) solvent (Acros Organics, Waltham, Mass., USA) to a polysulfone polymer ($M_n$~26,000 ($M_n$ being the number average molecular weight) from Sigma-Aldrich, St. Louis, Mo., USA) in transparent bead form in airtight glass bottles.

Alternatively dimethylformamide (DMF) can be used as the solvent. The mixture then is agitated for several hours until complete dissolution of the polysulfone polymer is achieved, forming a dope or casting solution. The casting solution can be cast or spread over a woven or non-woven mesh fabric layer, which optionally can be attached to glass plate via a knife-edge. In some embodiments, the glass plate with the mesh fabric layer and casting solution can be immediately immersed into demineralized water, which has been maintained at the desired temperature (such as from about 4° C. to about 30° C.). Immediately, phase inversion begins and after several minutes, the woven or non-woven fabric layer supporting the polysulfone membrane can be separated from the glass plate to form the support layer. The support layer then can be washed thoroughly with deionized water and stored in cold conditions until used. In a continuous coating process for production of a support layer (e.g., using equipment and/or a process similar to those described in U.S. Pat. Nos. 4,214,994; 4,277,344; 6,153,133; 7,490, 725; and 8,580,341; U.S. Pat. App. Pub. Nos. US2009/ 0050558A1 and US 2012/0292249A1, and international patent application published as WO 2014/080426 A1, which describe coating processes for continuous preparation of reverse osmosis membranes), a glass plate would not be required. The porous support layer typically is kept wet until use.

2. Discrimination Layer

At least one discrimination layer comprising a polyamide is formed on a surface of the support layer, thereby forming a thin film composite membrane. The discrimination layer can be synthesized using an interfacial polymerization process on the porous support membrane. In the synthesis of the discrimination layer, two immiscible solvents generally are used, usually an aqueous phase and an organic phase solution, so that a monomer in one solvent reacts with a monomer in the other solvent to polymerize and form the discrimination layer. The polymerization reactions are very fast and relatively high molecular weight polymers are obtained.

The discrimination layer is a permeable membrane containing any material as long as the discrimination layer allows filtration of a fluid for which filtration is desired. In an exemplary embodiment, the discrimination layer can be a polyamide layer. Although the chemistry of the discrimination layer is not to be viewed as limited, in an exemplary embodiment the polyamide layer can be formed by interfacial polymerization of a polar solution and a non-polar solution. An exemplary polar solution can be an aqueous phase containing a polyamine such as m-phenylenediamine (MPD). An exemplary non-polar solution can be an organic phase containing a polyfunctional acid halide such as trimesoyl chloride (TMC).

Discrimination layers prepared by methods and chemistries known in the art, for example, the chemistry and methods of manufacturing discrimination layers that are disclosed in any of U.S. Pat. Nos. 4,277,344; 4,902,424; 5,108,607; 5,543,046; 6,337,018; and 7,109,140, all of which are herein incorporated by reference, often do not exhibit adequate salt rejection and flux after formation on a surface of a support layer to produce a thin film composite membrane. As shown herein, the methods and chemistries known in the art can be modified to include a flux enhancing inclusion complex provided herein during formation of the discrimination layer, such as by adding the flux enhancing inclusion complex provided herein to the organic phase, or the aqueous phase, or both, producing thin film composite membranes that exhibit good flux and salt rejection, thereby overcoming the deficiencies of known membranes.

In some embodiments, the discrimination layer generally contains a polyamide formed by the interfacial polymerization between one or more di- or polyfunctional amines and one or more di- or polyfunctional acyl chlorides. The di- or polyfunctional amines can be aromatic and/or aliphatic. The di- or polyfunctional acyl chlorides can be aromatic and/or aliphatic.

Generally, the polymer matrix that forms the discrimination layer can be prepared by reaction of two or more monomers. The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. The first and second monomers can also be chosen so as to be capable of undergoing an interfacial polymerization reaction to form a polymer matrix (i.e., a three-dimensional polymer network) when brought into contact. The first and second monomers also can be selected so as to be capable of undergoing a polymerization reaction when brought into contact to form a polymer product that is capable of subsequent crosslinking by, e.g., exposure to heat, light radiation, or a chemical crosslinking agent.

The first monomer can be selected so as to be soluble in a polar liquid, preferably water, to form a polar mixture. Generally, the difunctional or polyfunctional nucleophilic monomer can have primary or secondary amino groups and can be aromatic (e.g., a diaminobenzene, a triaminobenzene, m-phenylenediamine, p-phenylenediamine, 1,3,5-triaminobenzene, 1,3,4-triaminobenzene, 3,5-diamino-benzoic acid, 2,4-diaminotoluene, 2,4-diaminoanisole, and xylylenediamine) or aliphatic (e.g., ethylenediamine, propylenediamine, piperazine, and tris(2-diamino-ethyl)amine). In a yet further example, the polar liquid and the first monomer can be the same compound; that is, the first monomer can provided and not dissolved in a separate polar liquid.

Examples of suitable amine species include primary aromatic amines having two or three amino groups, e.g., m-phenylene diamine, and secondary aliphatic amines having two amino groups, for example piperazine. In some embodiments, two or more different species of amine monomer can be included in the polar liquid (e.g., aqueous phase) to form a polar mixture. The amine can typically be applied to the microporous support as a solution in a polar liquid, e.g., water. The resulting polar mixture typically includes from about 0.1 wt % to about 20 wt %, preferably from about 0.5 wt % to about 6 wt %, amine. Once coated on a porous support layer, excess polar mixture optionally can be removed. The polar mixture need not be aqueous, but the polar liquid should be immiscible with the apolar liquid. Although water is a preferred solvent, non-aqueous polar solvents can be used, such as acetonitrile, lower monohydric alcohols and ketones. Combinations of water and one or more polar solvents can be used.

In some embodiments, a second monomer can be selected so as to be miscible with the polar liquid forming a polar mixture (i.e., aqueous phase). The second monomer optionally also can be selected so as to be immiscible with a non-polar liquid. The second monomer can be a dinucleophilic or a polynucleophilic monomer. The nucleophilic monomer can contain two or more, for example, three, nucleophilic groups per molecule.

In some embodiments, a second monomer can be selected so as to be miscible with the apolar (organic phase) liquid forming an apolar mixture, although for monomers having sufficient vapor pressure, the monomer optionally can be delivered from a vapor phase. The second monomer optionally also can be selected so as to be immiscible with a polar liquid. Typically, the second monomer can be a dielectrophilic or a polyelectrophilic monomer. The electrophilic monomer can be aromatic in nature and can contain two or more, for example three, electrophilic groups per molecule. The second monomer can be a trimesoyl halide. For the case of acyl halide electrophilic monomers, acyl chlorides are generally more suitable than the corresponding bromides or iodides because of the relatively lower cost and greater availability. As a further example, the second monomer can be a phthaloyl halide.

The polar mixture typically can be applied to the porous support layer by dipping, immersing, coating, spraying or any other application techniques. Once coated on the porous support layer, excess polar mixture optionally can be removed by evaporation, drainage, air knife, rubber wiper blade, nip roller, sponge, or other devices or processes.

In some embodiments of the processes provided herein, an aqueous phase is applied on a surface of a support layer, and an organic phase layer containing a flux enhancing inclusion complex provided herein then is applied, the components of which interact with components of the aqueous phase, and at the interface between these layers polymerization occurs, resulting in formation of a discrimination layer.

The method of forming the discrimination layer on a surface of the porous support layer can include floating the porous support layer on the surface of the aqueous phase, or casting the aqueous phase on a surface of the porous support layer; or spraying the aqueous phase onto a surface of the porous support layer; or immersing the porous support layer in the aqueous phase. In methods that include floating or immersing the porous support in the aqueous phase, the treating time can be varied very widely in a range of from about 1 second to about 24 hours or longer, but such treating time is not critical. In some embodiments, the treating time is at least 10 seconds. The treatment effected once is usually sufficient, but the treatment can be performed twice or more.

Interfacial polymerization can be done at ambient temperatures and pressures. In some embodiments, interfacial polymerization can be done at a temperature of from about 5° C. to about 40° C. In some embodiments, interfacial polymerization is be done at a temperature of from about 5° C. to about 30° C. In some embodiments, interfacial polymerization is be done at a temperature of from about 10° C. to about 30° C. In some embodiments, interfacial polymerization is be done at a pressure of 1 atmosphere. In some embodiments, interfacial polymerization is be done at a pressure of from about 0.8 atmospheres to about 1.2 atmospheres.

Representative conditions for reaction of an amine (e.g., MPD) with an electrophile (e.g., TMC) to form a polyamide thin film composite membrane, include use of a ratio of concentration of MPD to concentration of TMC in the range of from about 10:1 to about 20:1, with the MPD concentration being from about 1 wt % to about 6 wt % of the polar phase (aqueous phase). In some embodiments, the ratio of concentration of MPD to concentration of TMC is about 10:1, or about 11:1, or about 12:1, or about 13:1, or about 14:1, or about 15:1, or about 16:1, or about 17:1, or about 18:1, or about 19:1, or about 20:1. The polymerization reaction can be carried out at room temperature in an open environment, or the temperature of either the polar or the apolar liquid, or both, can be modulated or controlled, e.g., at a temperature above room temperature (which is from about 20° C. to 25° C.) or a temperature below room temperature. Once formed, the discrimination layer can act as a barrier to inhibit contact between the reactants and to slow the reaction. The discrimination layer typically is very thin and permeable to water, but relatively impermeable to dissolved, dispersed, or suspended solids, such as salts to be removed from saltwater or brackish water in use to produce purified water.

The polyfunctional acyl halide can be dissolved in the apolar organic liquid in a range of, for example, from about 0.01 wt % to about 10.0 wt %, or from about 0.03 wt % to about 3 wt % or from about 0.05 wt % to about 5 wt %. Suitable apolar liquids are capable of dissolving the electrophilic monomers (e.g., polyfunctional acyl halides) and are immiscible with a polar liquid (e.g., water). Generally the apolar organic liquid is a water-immiscible solvent that is inactive in the interfacial polymerization, does not form a chemical bond with the halide compound, and does not damage the porous support layer Exemplary apolar organic liquids that can be used to dissolve the acyl halide include aliphatic hydrocarbons, such as $C_5$-$C_{24}$ hydrocarbons and mixtures thereof, such as pentanes, hexanes, heptanes, octanes, etc., and isoparaffinic solvents such as Isopar™ isoparafinnic fluids (e.g., Isopar™ G petroleum naphtha, low odor, low aromatic $C_{10}$-$C_{12}$ isoalkanes solvent, ExxonMobil, Irving, Tex.) and Isane® isoparaffinic solvents (Total Special Fluids, Oudalle, France). The solvent used can be a single solvent or a mixture of solvents.

Additional apolar liquids can be included in the organic phase. For example, an apolar liquid that does not pose a threat to the ozone layer and yet are sufficiently safe in terms of their flashpoints and flammability to undergo routine processing without having to undertake extreme precautions can be selected. These can include $C_5$-$C_7$ hydrocarbons and higher boiling point hydrocarbons and aromatics, i.e., those with boiling points greater than about 90° C., such as $C_8^-C_{24}$ hydrocarbons and mixtures thereof, which have more suitable flashpoints than their $C_5$-$C_7$ counterparts, but are less volatile. Exemplary apolar liquids that can be included in the organic phase include trimethyl benzenes, such as 1,2,3-trimethylbenzene, 1,2,4-trimethylbenzene, and 1,3,5-trimethylbenzene; tetra-methyl-benzenes, such as 1,2,3,4-tetramethylbenzene, 1,2,4,5-tetramethylbenzene and 1,3,4,5-tetramethylbenzene; pentamethylbenzene, hexamethylbenzene, di-isopropyl-benzenes, tri-isopropyl-benzenes, and tetra-isopropylbenzene. In some embodiments, the organic phase includes polyfunctional acyl halide and 1,3,5-trimethylbenzene.

The organic phase can include antioxidants. For example, antioxidants for processing and long-term thermal stabilization can be included in the organic phase. Antioxidants can protect the membrane against degradation, for example, from light exposure. Exemplary antioxidants include phenolic primary antioxidants, such as the phenolic primary antioxidant pentaerythritol tetrakis(3-(3,5-di-tert-butyl-4-hydroxy-phenyl)propionate), sold as Irganox® 1010. The antioxidant can be dissolved in the organic phase in a range of, for example, from about 0.0025 wt % to 0.05 wt %, or from about 0.005 wt % to 0.025 wt %, or from about 0.01 wt % to about 0.025 wt %.

The polyfunctional acyl halide can be dissolved in the non-polar organic liquid in a range of, for example, from about 0.01 wt % to about 10.0 wt %, or from about 0.03 wt % to about 3 wt % or from about 0.05 wt % to about 5 wt %.

The apolar mixture typically can be applied by dipping, immersing, coating, spraying or any other application technique.

In some embodiments, the polyfunctional acyl halide monomer (also referred to as acid halide) is coated on the porous support layer, typically by application of the organic phase solution. Amine solution is typically coated first on the porous support followed by the acyl halide solution. The monomers can react when in contact, thereby polymerizing to produce a polymer (e.g., polyamide) matrix discrimination layer at the upper surface of the support layer. Although one or both of the polyfunctional amine and acyl halide layers can be applied to the porous support layer from a solution, such as by application of the aqueous and organic phases discussed above, they can alternatively be applied by other means, such as by vapor deposition, or heat.

It can be advantageous to store the support layer for a period of time, e.g., from 1 minute for up to one hour, before interfacial polymerization on the support layer between aqueous and organic phase solutions. In some embodiments, the discrimination layer can be formed by applying the organic phase solution to the support layer and, after at least 10 seconds, or after about 30 seconds, or after about 1 minute, or after about 2 minutes, or after about 5 minutes after the organic phase solution was applied, applying the aqueous phase to the organic phase solution on the support layer. For example, the organic phase solution can be applied to the support layer, allowed to be in contact with the support layer for at least 10 seconds, followed by a draining period of at least 10 seconds, followed by application of the aqueous phase, and then after at least 10 seconds, subjecting the formed discrimination layer to drying conditions, such as in an oven, for at least 1 minute, or at least 5 minutes, or for a time period ranging from 0.5 minutes to 60 minutes. In some embodiments, the membrane is heated in a ventilated oven, the membrane passing through an oven set at a suitable temperature, e.g., from about 80° C. to about 180° C., for a suitable period, e.g., from about 1 minute to about 60 minutes. Other ways of heating may of course also be used, such as the use of infrared or radiant heat. The membrane can be dried in an oven with the web reaching a temperature of from about 90° C. to about 100° C., or about 95° C.

In some embodiments, the discrimination layer can be formed by applying the aqueous phase to the support layer, removing excess aqueous phase or allowing it to dry, and then, after at least 10 seconds, or after about 30 seconds, or after about 1 minute, or after about 2 minutes, or after about 5 minutes after the aqueous phase solution was applied, applying the organic phase solution to the aqueous phase on the support layer. For example, the aqueous phase solution can be applied to the support layer, allowed to be in contact with the support layer for at least 10 seconds, followed by a draining period of at least 10 seconds, followed by application of the organic phase, and then after at least 10 seconds, subjecting the formed discrimination layer to drying conditions, such as in an oven, for at least 1 minute, or at least 5 minutes, or for a time period ranging from 0.5 minutes to 10 minutes. The membrane can be dried in an oven with the web reaching a temperature of 95° C.

The amount of flux enhancing inclusion complex added to the organic phase is from about 0.001 wt % to about 1 wt %, based on the weight of the organic phase. In some embodiments, the amount of flux enhancing inclusion complex added to the organic phase is from about 0.005 wt % to about 0.75 wt %, or from about 0.05 wt % to about 0.5 wt %, or from about 0.01 wt % to about 0.1 wt %, based on the weight of the organic phase. In some embodiments, the amount of flux enhancing inclusion complex added to the organic phase is at least 0.005 wt %, or at least 0.01 wt %, or at least 0.025 wt %, or at least 0.05 wt %, or at least 0.075 wt %, or at least 0.1 wt %.

In some embodiments, the amount of the flux enhancing inclusion complex used in the organic phase is selected to yield a ratio of the amount of flux enhancing inclusion complex to the amount of acyl halide in the range of from about 1:1 to about 1:1000. The ratio of the amount of flux enhancing inclusion complex to the amount of acyl halide can be from 1:1 to 1:100, or 1:1 to 1:30, or 1:3 to 1:30. Suitable polyfunctional acyl halides include trimesoyl chloride (TMC), trimellitic acid chloride, isophthaloyl chloride, terephthaloyl chloride and similar compounds or blends of suitable acyl halides. In some embodiments, the acyl halide is TMC, and the concentration of TMC is from about 0.1 wt % to about 1 wt % of the organic phase, and the ratio of the amount of flux enhancing inclusion complex to the amount of TMC is from about 1:1 to about 1:100. In some embodiments, the ratio of the amount of flux enhancing inclusion complex to the amount of TMC is from about 1:1 to about 1:30.

Practice of the invention does not depend critically on the overall shape of the thin film composite membrane. Flat sheet and hollow fiber configurations are two of the possibilities for this overall shape. For flat sheet membranes, a discrimination layer can be on the top surface, the bottom surface, or on both surfaces of the support layer. For hollow fiber membranes, a discrimination layer can be on the inner surface of the support layer, the outer surface of the support layer, or on both inner and outer surfaces of the support layer.

3. Protective Layer

The thin film composite semipermeable membrane produced by the methods provided herein can be provided with a protective coating layer by coating the surface of the membrane with an aqueous phase of a water-soluble organic polymer in order to protect the membrane surface from damage during the handling of the membrane. Examples of such a water-soluble organic polymer include polymers such as polyethylenimine, polyvinyl alcohol, polyvinyl ether, polyvinylpyrrolidone, polyacrylamide, or polyacrylic acid; copolymers consisting mainly of the monomers constituting these polymers; derivatives of these polymers or copolymers; and mixtures of these compounds. Among them, polyvinyl alcohol, polyethylenimine and polyvinylpyrrolidone are particularly preferred.

The membrane coated with such an aqueous phase of the water-soluble organic polymer generally is subjected to drying. The drying is effected by exposing the coated membrane to temperature of from about 30° C. to about 120° C. for a time of about 1 minute to about 20 minutes. The time required for drying depends on the type of oven used and membrane placement within the oven. In some embodiments, the oven is a convection oven or and infrared oven. In some embodiments, the oven temperature is from 65°-120° C. In some embodiments, the oven temperature is from 80°-110° C.

4. Anti-Fouling Layer

Anti-fouling layers can be deposited on either or both surfaces of the thin-film composite membrane. An RO membrane can be provided with an anti-fouling capacity by applying a layer capable of forming halamines on the feed stream contact surface of the RO membrane (see U.S. Pat. No. 8,567,612). For example, an anti-fouling layer can be formed by depositing a nitrogen-containing polymer solution on the discrimination layer. The polymer can be cross-linked to insolubilize the anti-fouling layer. An intermediate layer can be positioned between the anti-fouling and the discrimination layer so that the thickness and permeability of the anti-fouling and intermediate layer are sufficient to cause halamine formation at the surface of the anti-fouling layer before the discrimination layer is degraded by the halogen. Sufficient nitrogen can be provided in the anti-fouling layer to protect the discrimination layer from fouling by the formation of halamines on the surface of the anti-fouling layer adjacent the feed stream, to permit recharging of the anti-fouling layer by the further addition of halogens thereto to form additional halamines and/or to prevent halogen damage to the discrimination layer by the halogen during operation after multiple recharging.

Other chemistries and techniques for providing an anti-fouling layer, such as treatment with polyethylene oxide to introduce PEG moieties, or using fluorinated polymers or polyacrylonitrile graft copolymers, are known in the art (e.g., see U.S. Pat. Nos. 8,163,814; 8,505,743; 8,505,745; and 8,754,139, the disclosure of each of which is incorporated by reference herein).

F. Modules

The membranes produced using the processes described herein can be spirally wound around a central porous permeate collection tube to produce a semipermeable membrane module for use in a pressure vessel. A typical spirally wound semipermeable membrane module includes a plurality of leaves that are individual envelopes of sheet-like semipermeable membrane material that sandwich therebetween a layer of porous permeate carrying material, such as polyester fibrous sheet material. The semipermeable membrane material includes the membranes produced using the processes described herein.

Interleaved between adjacent leaves generally are lengths of spacer material, which may be woven or non-woven or other open mesh, screen-like crosswise designs of synthetic filaments, e.g. cross-extruded filaments of polypropylene, that provide flow passageways for the feed water being pumped from end to end through the pressure vessel. An appropriate lay-up of such alternating leaves and spacer sheets is then spirally wound about a hollow tube having a porous sidewall to create a right circular cylindrical module. An exemplary spirally wound separation module is shown in FIG. 1 and in U.S. Pat. No. 4,842,736, the disclosure of which is incorporated herein by reference. The module contains a plurality of spiral feed passageways, through which passageways the feed liquid being treated flows in an axial direction. Internally within the membrane envelopes, the permeating liquid flows along a spiral path inward until it reaches the perforated central tube where it collects and through which it then flows axially to the outlet.

FIG. 1 illustrates an exemplary embodiment of a spiral-wound module. The module includes perforated central tube 1 that collects the filtered fluid. The material of perforated central tube 1 is not limited and can be any material that is resistant to corrosion to the fluid being filtered. In exemplary embodiments, perforated central tube 1 can be made of polyvinyl chloride (PVC). Other materials that can also be used include metals, polymers, ceramics, or combination thereof. Additional exemplary materials that can be used to form the perforated central tube 1 include plastic materials such as acrylonitrile-butadiene-styrene, polysulfone, poly (phenylene oxide), polystyrene, polypropylene, polyethylene or the like. The size and arrangement of the perforations can be arranged in any manner desirable as long as they allow for the filtered fluid to flow into the perforated central tube 1. Wound around perforated central tube 1 is a set of leafs composed of folded permeable membrane sheets 2, feed channel spacers 3, and permeate collection sheet 4. Around the outside of the module is a shell 5 and an anti-telescoping device 6 is located at each end of the module.

Modules containing membranes produced using the processes described herein can be used to produce a stream of potable water from tap water, brackish water or sea water.

G. Membrane Characteristics

In preferred embodiments, the salt rejection is at least 96% and the flux of seawater water (32,000 ppm NaCl) is at least 30, 31, 32, 33, 34, 35, 36, 37, 38, 39 or 40 gallons/ft$^2$/day (gfd) at 800 psi.

Water flux can be determined by measuring permeate flow using Equation 1:

$$\text{Flux}(gfd) = \frac{\text{permeate(gallons)}}{\text{membrane area}(ft^2) \cdot \text{time(day)}}.$$

Salt rejection (R, in %) can be calculated using Equation 2:

$$R(\%) = \left(1 - \frac{Cp}{Cf}\right) \times 100$$

where $C_f$ is the concentrations of salt in the feed water and the ($C_p$ is the concentrations of salt in the permeate, both of which can be measured using a calibrated conductivity meter.

H. EXAMPLES

The following examples are included for illustrative purposes only and are not intended to limit the scope of the embodiments provided herein.

Example 1

Inclusion Complex with Glyme as Host

An inclusion complex containing a metal chelate as the guest component and 2 glyme molecules as the host component was prepared. The metal chelate was Ca(F6acac)$_2$, where F6acac refers to 1,1,1,5,5,5-hexafluoro-acetylacetonate.

The inclusion complex was prepared by mixing 1:2:2 molar equivalents of calcium carbonate, glyme and hexafluoroacetylacetone, respectively, in anhydrous tetrahydrofuran. The resulting inclusion complex was collected as a crystalline white solid. $^1$H NMR (500 MHz, DMSO-d$_6$): δ=5.48 (s, 2H), 3.54 (s, 8H), 3.38 (s, 12H)

Example 2

Inclusion Complex with Crown Ether as Host

An inclusion complex containing a metal chelate as the guest component and a crown ether as the host component was prepared. The metal chelate was Ca(F6acac)$_2$, and the host component was 18-crown-6 ether. The inclusion complex was prepared by mixing 1:1:2 molar equivalents of calcium carbonate, 18-crown-6 ether and hexafluoroacetylacetone, respectively, in anhydrous tetrahydrofuran. The resulting inclusion complex was collected as a crystalline white solid. $^1$H NMR (500 MHz, DMSO-d$_6$): δ=5.47 (s, 2H), 3.54 (s, 24H).

Examples 3-5

Comparative Membranes

Three comparative membranes were prepared using varying organic phases for comparison. In Example 3, the organic phase included no additives. In Example 4, the organic phase included 0.1 wt % glyme. In Example 5, the organic phase included 0.1 wt % 18-crown-6 ether.

For each of comparative Examples 3-5, an aqueous phase was prepared. The aqueous phase contained 4.5 wt % triethylammonium camphorsulfonate (TEACSA, Sunland Chemicals, Los Angeles, Calif.), 4 wt % m-phenylene diamine (MPD, Dupont, Wilmington, Del.) and 0.1 wt % Brij™ 98 nonionic surfactant (polyoxyethylene (20) oleyl ether, available from Fisher Scientific, Waltham, Mass.). The aqueous phase was prepared by first adding the DI water to a mixing vessel, followed by addition of the TEACSA, MPD and Brij™ 98, although any permutation of order of addition of the components can be used.

Example 3

No Additives in the Organic Phase

The membrane of comparative Example 1 was prepared using an organic phase that contained no additives. The organic phase solution contained 0.3 wt % TMC (Sigma Aldrich, St. Louis, Mo.) and 4 wt % mesitylene (1,3,5-trimethylbenzene, Sigma Aldrich, St. Louis, Mo.) in an isoparafinnic solvent, Isopar™ G solvent (a low odor, low aromatic hydrocarbon solvent from ExxonMobile Chemical Company, Houston, Tex.). The organic phase was prepared by placing the Isopar G in a vessel, and mixing in the TMC and mesitylene in any order.

Example 4

Glyme in the Organic Phase

In comparative Example 2, glyme was included in the organic phase. The organic phase solution contained 0.3 wt % TMC, 4 wt % mesitylene, and 0.1 wt % glyme (dimethoxyethane, Fisher Scientific, Waltham, Mass.) in an isoparafinnic solvent, Isopar™ G solvent. The organic phase was prepared by placing the Isopar G in a vessel, and mixing in the glyme, TMC and mesitylene in any order, separately or in any combination.

Example 5

18-Crown-6 Ether in the Organic Phase

In comparative Example 3, 18-crown-6 ether was included in the organic phase. The organic phase solution contained 0.3 wt % TMC, 4 wt % mesitylene, and 0.1 wt % 18-crown-6 ether (Fisher Scientific, Waltham, Mass.) in an isoparafinnic solvent, Isopar™ G solvent. The organic phase was prepared by placing the Isopar G in a vessel, and mixing in the glyme, TMC and mesitylene in any order, separately or in any combination.

Membrane Formation

For each of comparative Examples 3-5, a separate polyester non-woven reinforced polysulfone support was used. The aqueous phase was applied to the polysulfone support at ambient temperature (25° C.) and pressure (1 atm). After 10 seconds, any excess aqueous solution remaining on the surface of the support layer was absorbed or pushed with a roller to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the web reaching a temperature of 95° C. The membrane remained in the oven for 6 minutes.

Membrane performance was measured in a flat sheet cell test apparatus. The testing was conducted at a Reynolds number of 2500, so that build-up of rejected solutes at the membrane surface leads to a concentration of no more than 10% higher than that in the bulk. Testing was performed on seawater (32,000 ppm NaCl in deionized or RO water) at 800 psi, at 25° C. Membranes were run for 1 hour before performance characteristics (e.g., water flux and salt rejection) were measured. Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using Equation 2. The results for the membranes of Examples 3-5 are shown in Table 2.

TABLE 2

Membrane Characteristics for Comparative Membranes

| Example | Additive In Organic Phase | Flux (gfd) | Rejection (%) |
|---|---|---|---|
| 3 | No additives | 25.2 | 99.66 |
| 4 | Glyme (0.1 wt %) | 25.1 | 99.67 |
| 5 | 18-crown-6 ether (0.1 wt %) | 24.8 | 99.63 |

The data show that the addition of glyme alone (comparative Example 4) to the organic phase during preparation of the membrane resulted in a membrane having essentially the same flux and rejection as that obtained in the control membrane prepared with no additives (comparative Example 3). Addition of 18-crown-6 ether alone (comparative Example 5) to the organic phase during preparation of the membrane had a slight negative impact on membrane performance, the resulting membrane having a flux and rejection slightly less than that obtained in the control membrane prepared with no additives added to the organic phase during preparation of the membrane (comparative Example 3).

Examples 6-8

Comparative Membranes

Three comparative membranes were prepared using varying amounts of the metal chelate Ca(F6acac)$_2$ added to the aqueous phase (the chelate was insoluble in the solvent Isopar™ G) for comparison.

For each of comparative Examples 6-8 the aqueous phase contained 4.5 wt % TEACSA, 4 wt % MPD, 0.1 wt % Brij™ 98 nonionic surfactant and from 0.025 wt % to 0.1 wt % metal chelate Ca(F6acac)$_2$. In Example 6, the aqueous phase included 0.025 wt % metal chelate. In Example 7, the aqueous phase included 0.05 wt % metal chelate. In Example 8, the aqueous phase included 0.1 wt % metal chelate. The aqueous phase was prepared by first adding the DI water to a mixing vessel, followed by addition of the TEACSA, MPD and Brij™ 98 and the metal chelate, although any permutation of order of addition of the components can be used.

The membrane of comparative Examples 6-8 was prepared using an organic phase that contained no additives. The organic phase solution contained 0.3 wt % TMC and 4 wt % mesitylene in Isopar™ G solvent. The organic phase was prepared by placing the Isopar G in a vessel, and mixing in the TMC and mesitylene in any order.

Membrane Formation

For each of comparative Examples 6-8, a separate polyester non-woven reinforced polysulfone support was used. The aqueous phase was applied to the polysulfone support at ambient temperature (25° C.) and pressure (1 atm). After 10 seconds, any excess aqueous solution remaining on the surface of the support layer was absorbed or pushed with a roller to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the web reaching a temperature of 95° C. The membrane remained in the oven for 6 minutes.

Membrane performance was measured in a flat sheet cell test apparatus. The testing was conducted at a Reynolds number of 2500, so that build-up of rejected solutes at the membrane surface leads to a concentration of no more than 10% higher than that in the bulk. Testing was performed on seawater (32,000 ppm NaCl in deionized or RO water) at 800 psi, at 25° C. Membranes were run for 1 hour before performance characteristics (e.g., water flux and salt rejection) were measured. Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using Equation 2. The results for the membranes of Examples 6-8 are shown in Table 3.

TABLE 3

Membrane Characteristics for Comparative Membranes

| Example | Chelate in Aqueous Phase | Flux (gfd) | Rejection (%) |
|---|---|---|---|
| 6 | 0.025 wt % | 27.3 | 99.63 |
| 7 | 0.05 wt % | 28.9 | 99.61 |
| 8 | 0.1 wt % | 30.1 | 99.54 |

The data show that addition of the metal chelate to the aqueous phase results in the formation of membranes with increased flux compared to membranes compared with no additives added to the aqueous or organic phase (Comparative Example 1, which had a flux of 25.2). The data also show that the addition of the metal chelate had a negligible effect on salt rejection.

Examples 9-12

Membranes Prepared with Inclusion Complex of Example 1

The membranes of Examples 9-12 were prepared using an organic phase that included the flux enhancing inclusion complex of Example 1. The organic phase solution contained 0.3 wt % TMC, 4 wt % mesitylene and 0.025 wt % (Example 6), or 0.05 wt % (Example 7), or 0.075 wt % (Example 8), or 0.1 wt % (Example 9) of the flux enhancing inclusion complex of Example 1 in Isopar™ G solvent. The organic phase was prepared by placing the Isopar G in a vessel, and mixing in the TMC, mesitylene and the flux enhancing inclusion complex of Example 1, although any permutation of order of addition of the components can be used.

An aqueous phase was prepared. The aqueous phase contained 4.5 wt % TEACSA, 4 wt % MPD and 0.1 wt % Brij™ 98 nonionic surfactant in deionized (DI) water. The aqueous phase was prepared by first adding the DI water to a mixing vessel, followed by addition of the TEACSA, MPD and Brij™ 98, although any permutation of order of addition of the components can be used.

A membrane was prepared by applying the aqueous phase to a polyester non-woven reinforced polysulfone support. The aqueous phase was applied to the polysulfone support at ambient temperature (25° C.) and pressure (1 atm). After 10 seconds, any excess aqueous solution remaining on the surface of the support layer was absorbed or pushed with a roller to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the web reaching a temperature of 95° C. The membrane remained in the oven for 6 minutes.

Membrane performance was measured in a flat sheet cell test apparatus. The testing was conducted at a Reynolds number of 2500, so that build-up of rejected solutes at the membrane surface leads to a concentration of no more than 10% higher than that in the bulk. Testing was performed on seawater (32,000 ppm NaCl in deionized or RO water) at 800 psi, at 25° C. Membranes were run for 1 hour before performance characteristics (e.g., water flux and salt rejection) were measured. Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using Equation 2. The results for the membranes of Examples 9-12 are shown in Table 4.

TABLE 4

Membranes Prepared with Inclusion Complex of Example 1

| Example | Example 1 Inclusion Complex (wt %) | Flux (gfd) | Rejection (%) |
|---|---|---|---|
| 9 | 0.025 | 28.9 | 99.66 |
| 10 | 0.05 | 29.4 | 99.62 |
| 11 | 0.075 | 29.8 | 99.57 |
| 12 | 0.1 | 30.1 | 99.54 |

Examples 13-15

Membranes Prepared with Inclusion Complex of Example 2

Membranes of Examples 13-15 were prepared using an organic phase that included the flux enhancing inclusion complex of Example 2. The organic phase solution contained 0.3 wt % TMC, 4 wt % mesitylene and 0.025 wt % (Example 13), or 0.05 wt % (Example 14), or 0.1 wt % (Example 15) of the flux enhancing inclusion complex of Example 2 in an isoparaffinic solvent, Isopar™ G solvent. The organic phase was prepared by placing the Isopar G in a vessel, and mixing in the TMC, mesitylene and the flux enhancing inclusion complex of Example 1, although any permutation of order of addition of the components can be used.

An aqueous phase was prepared. The aqueous phase contained 4.5 wt % TEACSA, 4 wt % MPD and 0.1 wt % Brij™ 98 nonionic surfactant in deionized (DI) water. The aqueous phase was prepared by first adding the DI water to a mixing vessel, followed by addition of the TEACSA, MPD and Brij™ 98, although any permutation of order of addition of the components can be used.

A membrane was prepared by applying the aqueous phase to a polyester non-woven reinforced polysulfone support. The aqueous phase was applied to the polysulfone support at ambient temperature (25° C.) and pressure (1 atm). After 10 seconds, any excess aqueous solution remaining on the surface of the support layer was absorbed or pushed with a roller to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the web reaching a temperature of 95° C. The membrane remained in the oven for 6 minutes.

Membrane performance was measured in a flat sheet cell test apparatus. The testing was conducted at a Reynolds number of 2500, so that build-up of rejected solutes at the membrane surface leads to a concentration of no more than 10% higher than that in the bulk. Testing was performed on seawater (32,000 ppm NaCl in deionized or RO water) at 800 psi, at 25° C. Membranes were run for 1 hour before performance characteristics (e.g., water flux and salt rejection) were measured. Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using Equation 2. The results for the membranes of Examples 13-15 are shown in Table 5.

TABLE 5

Membranes Prepared with Inclusion Complex of Example 2

| Example | Example 2 Inclusion Complex (wt %) | Flux (gfd) | Rejection (%) |
|---|---|---|---|
| 13 | 0.025 | 33.4 | 98.15 |
| 14 | 0.05 | 35.3 | 96.78 |
| 15 | 0.1 | 35.8 | 96.02 |

Comparison of Membranes

The membrane characteristics of membranes prepared with an organic phase containing a flux enhancing inclusion complex provided herein were compared to the membrane prepared with no additives in the organic phase (Comparative Example 3). The percentage change in water flux and rejection compared to Comparative Example 3 for each of the membranes prepared with an organic phase containing a flux enhancing inclusion complex provided herein is shown in Table 6.

TABLE 6

Comparison to Membrane Made With No Additives

| Example | Flux (gfd) | Change from Ex. 3 | % Change | Rejection (%) | Change from Ex. 3 | % Change |
|---|---|---|---|---|---|---|
| 3 | 25.2 | — | — | 99.66 | — | — |
| 9 | 28.9 | 3.7 | 14.68 | 99.66 | 0 | 0 |
| 10 | 29.4 | 4.2 | 16.67 | 99.62 | −0.04 | −0.04 |
| 11 | 29.8 | 4.6 | 18.25 | 99.57 | −0.09 | −0.09 |
| 12 | 30.1 | 4.9 | 19.44 | 99.54 | −0.12 | −0.12 |
| 13 | 33.4 | 8.2 | 32.54 | 98.15 | −1.51 | 1.52 |
| 14 | 35.3 | 10.1 | 40.08 | 96.78 | −2.88 | 2.89 |
| 15 | 35.8 | 10.6 | 42.06 | 96.02 | −3.64 | 3.65 |

The data show that the addition of the flux enhancing inclusion complex to the organic phase prior to interfacial polymerizing between the aqueous and organic phases significantly improved the flux performance of the membrane compared to a membrane prepared without any additives in the organic or aqueous phases (comparative example 3). The membranes prepared with an organic phase containing the flux enhancing inclusion complex of Example 1 or Example 2 exhibited good salt rejection, and significantly improved water flux. The membranes prepared with an organic phase containing the flux enhancing inclusion complex of Example 1 exhibited an increase in flux of from about 14% to 19% over the control membrane with no, or negligible, negative impact on rejection. The membranes prepared with an organic phase containing the flux enhancing inclusion complex of Example 2 exhibited an increase in flux of from about 32% to about 42% over the control membrane with slight negative impact on rejection.

The membrane characteristics of membranes prepared with an organic phase containing a flux enhancing inclusion complex provided herein were compared to membrane prepared with a metal chelate additive in the aqueous phase (Comparative Examples 4-6). The percentage change in water flux for each of the membranes prepared with an organic phase containing a flux enhancing inclusion complex provided herein is shown in Table 7.

TABLE 7

Flux Comparison to Membranes Made With Metal Chelate

| Example | Additive | Flux (gfd) | % Change |
| --- | --- | --- | --- |
| 6 | 0.025 wt % chelate | 27.3 | — |
| 9 | 0.025 wt % complex of Ex. 1 | 28.9 | 5.9 |
| 13 | 0.025 wt % complex of Ex. 2 | 33.4 | 22.3 |
| 7 | 0.5 wt % chelate | 28.9 | — |
| 10 | 0.5 wt % complex of Ex. 1 | 29.4 | 1.7 |
| 14 | 0.5 wt % complex of Ex. 2 | 35.3 | 22.1 |
| 8 | 0.1 wt % chelate | 30.1 | — |
| 12 | 0.1 wt % complex of Ex. 1 | 30.1 | 0 |
| 15 | 0.1 wt % complex of Ex. 2 | 35.8 | 18.9 |

The data show that the addition of the flux enhancing inclusion complex to the organic phase prior to interfacial polymerizing between the aqueous and organic phases improved the flux performance of the membrane compared to a membrane prepared with only a metal chelate present in the aqueous phase (Comparative Examples 6-8). The membranes prepared with an organic phase containing the flux enhancing inclusion complex of Example 2 exhibited significant improvement in flux while exhibiting only minor reduction in salt rejection. Even at the lowest tested level of flux enhancing inclusion complex of Example 2 (0.025 wt %) present in the organic phase during interfacial polymerization, the resulting membranes exhibited an improvement of about 22% or more in flux through the membrane under the conditions tested.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flux enhancing inclusion complex, comprising:
    a host component having a cavity, wherein the host component comprises a crown ether or derivative thereof, or at least two glyme molecules; and
    a guest component within the cavity, wherein the guest component includes a metal chelate containing a metal atom or metal ion, and a bidentate ligand.

2. The complex of claim 1, wherein the crown ether is selected from among 12-crown-4, 15-crown-5, 18-crown-6, 20-crown-6, 21-crown-7, 24-crown-8, dicyclohexyl-18-crown-6, dibenzo-18-crown-6, 1,10-diaza-18-crown-6, 1,7,13-triaza-18-crown-6, and 1,4,10,13-tetraaza-18-crown-6, and the crown ether is unsubstituted or is substituted with one or more substituents selected from among vinyl, benzo, amido, aryl, thia, aza, alkyl, haloalkyl, and nitro substituents and combinations thereof.

3. The complex of claim 1, wherein the metal atom or metal ion is selected from among Group 2 or Group 13 of the periodic table.

4. The complex of claim 1, wherein the metal atom or metal ion is an alkaline earth metal.

5. The complex of claim 1, wherein the bidentate ligand is selected from among:

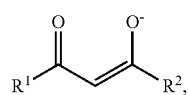

Formula 1

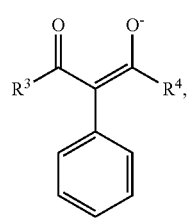

Formula 2

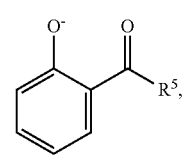

Formula 3

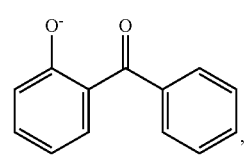

Formula 4

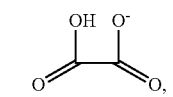

Formula 5

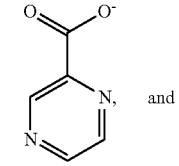

Formula 6 and

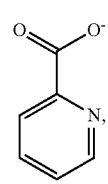

Formula 7 wherein each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered aromatic ring, a 6-membered aromatic ring, an aromatic bicyclic ring system containing two fused 6-membered rings, and an aromatic bicyclic ring system containing a 5-membered ring fused to a 6-membered aromatic ring.

6. The complex of claim 1, wherein the bidentate ligand is an acetylacetonate (acac) or fluorinated acetylacetonate.

7. The complex of claim 1, wherein the metal chelate containing a bidentate ligand and a metal atom or metal ion is selected from among Al(acac)$_3$, Al(F6acac)$_3$, Ba(acac)$_2$, Ba(F6acac)$_2$, Be(acac)$_2$, Be(F6acac)$_2$, Ca(acac)$_2$, Ca(F6acac)$_2$, Cd(acac)$_2$, Cd(F6acac)$_2$, Ce(acac)$_3$, Ce(F6acac)$_3$, Cr(acac)$_3$, Co(acac)$_3$, Cu(acac)$_2$, Cu(F6acac)$_2$, Dy(acac)$_3$, Er(acac)$_3$, Fe(acac)$_2$, Fe(acac)$_3$, Ga(acac)$_3$, Hf(acac)$_4$, In(acac)$_3$, K(acac), Li(acac), Mg(acac)$_2$, Mg(F6acac)$_2$, Mn(acac)$_2$, Mn(acac)$_3$, MoO$_2$(acac)$_2$, MoO$_2$(F6acac)$_2$, Na(acac), Nd(acac)$_3$, Nd(F6acac)$_3$, Ni(acac)$_2$, Ni(F6acac)$_2$, Pd(acac)$_2$, Pr(acac)$_3$, Pr(F6acac)$_3$, Ru(acac)$_3$, Ru(F6acac)$_3$, Sc(acac)$_2$, Sc(F6acac)$_2$, Sm(acac)$_3$, Sn(acac)$_2$, Sn(acac)$_2$Cl$_2$, t-butyl-Sn(acac)$_2$, t-butyl-Sn(acac)$_2$Cl$_2$, Sn(F6acac)$_2$, Sr(acac)$_2$, Sr(F6acac)$_2$, Tb(acac)$_3$, V(acac)$_3$, Y(acac)$_3$, Y(F6acac)$_3$, Zn(acac)$_2$, Zn(F6acac)$_2$, and Zr(acac)$_4$, wherein F6acac refers to 1,1,1,5,5,5-hexafluoroacetylacetonate.

8. The complex of claim 1, wherein the bidentate ligand is a beta-diketonate or a fluorinated beta-diketonate.

9. The complex of claim 1, wherein the bidentate ligand is selected from among pentane-2,4-dionate, 1,5-difluoropentane-2,4-dionate, 1,1,5,5-tetrafluoropentane-2,4-dionate, 1,1,1,5,5,5-hexafluoro-pentane-2,4-dionate, propane-1,3-dionate, butane-1,3-dionate, 4-fluorobutane-1,3-dionate, 4,4-difluorobutane-1,3-dionate, 4,4,4-trifluorobutane-1,3-dionate, heptane-3,5-dionate, 1-fluorohexane-2,4-dionate, 1,5-difluoropentane-2,4-dionate, 1,1,5-trifluoropentane-2,4-dionate, 1,1,5,5-tetrafluoro-pentane-2,4-dionate, 1,1,1,5,5-pentafluoro-pentane-2,4-dionate, 1,1,1,5,5,5-hexafluoropentane-2,4-dionate and octane-3,5-dionate and combinations thereof.

10. A process for preparing a thin film composite membrane, comprising:
(a) preparing an aqueous phase comprising a polyamine, and an organic phase comprising a polyfunctional acid halide, wherein the aqueous phase or organic phase or both further include the flux enhancing inclusion complex of claim 1;
(b) applying the aqueous phase to a surface of a porous support membrane to form a coated support membrane; and
(c) applying the organic phase to the coated support membrane and interfacially polymerizing the polyamine and the polyfunctional acid halide to form a discrimination layer of a thin film composite membrane comprising the porous support membrane and the discrimination layer, the thin film composite membrane having a water flux that is greater than the water flux of a thin film composite membrane prepared in the absence of the flux enhancing inclusion complex.

11. The process of claim 10, wherein the amount of the flux enhancing inclusion complex included in the organic phase is from about 0.001 wt % to about 1 wt %, based on the weight of the organic phase.

12. The process of claim 10, wherein the process further comprises adding a processing aid selected from among a surfactant, a co-solvent, a drying agent, a catalyst or any combination thereof to the aqueous phase or organic phase prior to applying the aqueous phase or organic phase to the porous support membrane, wherein the amount of processing aid is from about 0.001 wt % to about 10 wt % based on the weight of the aqueous phase or organic phase.

13. The process of claim 10, further comprising adding hexamethyl phosphoramide or a dialkyl sulfoxide or a combination thereof to the aqueous phase or organic phase or both in an amount of from about 0.5 wt % to 5 wt % based on the weight of the aqueous phase or the organic phase, wherein the dialkyl sulfoxide is of the formula:

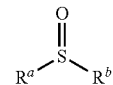

wherein each of $R^a$ and $R^b$ independently is selected from among $C_1$-$C_{25}$ alkyl and $C_1$-$C_{20}$ hydroxyalkyl.

14. The process of claim 10, wherein the aqueous phase or the organic phase or both further comprises nanoparticles selected from among zeolites, fullerenes and carbon nanotubes and combinations thereof, wherein the nanoparticles are present in an amount from about 0.001 wt % to about 0.5 wt % based on the weight of the aqueous phase or the organic phase.

15. The process of claim 10, wherein the thin film composite membrane is a reverse osmosis membrane.

16. A thin film composite membrane prepared according to the process of claim 10.

17. The thin film composite membrane of claim 16 that is a reverse osmosis membrane.

18. The reverse osmosis membrane of claim 17, wherein:
the membrane exhibits a water flux of at least 30 gfd when the membrane is exposed to deionized water containing 32,000 ppm NaCl at a temperature of 25° C. and a pressure of 800 psi; or
the membrane exhibits a salt rejection of at least 96% and a water flux of at least 35 gfd when the membrane is exposed to deionized water containing 32,000 ppm NaCl at a temperature of 25° C. and a pressure of 800 psi.

19. A method of purifying tap water or seawater or brackish water, comprising:
a) contacting the tap water with the reverse osmosis membrane of claim 17 at a hydrostatic pressure of about 100 psi or less; or
b) contacting the seawater with the reverse osmosis membrane of claim 17 at a hydrostatic pressure of about 800 psi or less; or
c) contacting the brackish water with the reverse osmosis membrane of claim 17 at a hydrostatic pressure of about 225 psi or less.

20. A reverse osmosis module, comprising a reverse osmosis membrane of claim 17 spirally wound around a central perforated tube.

21. A reverse osmosis membrane, comprising:
a support membrane; and
on a surface of the support membrane a discrimination layer formed by interfacially polymerizing a polyamine and a polyfunctional acid halide in the presence of a flux enhancing inclusion complex of claim 1, wherein:
the membrane exhibits a water flux of from about 30 gfd to about 40 gfd and a salt rejection of from about 96% to about 99.7% when the membrane is exposed to deionized water containing 32,000 ppm NaCl at a temperature of 25° C. and a pressure of 800 psi.

* * * * *